US012792160B1

(12) United States Patent
Chatzikalymnios et al.

(10) Patent No.: US 12,792,160 B1
(45) Date of Patent: Nov. 10, 2026

(54) COLLABORATIVE OBJECT TRACKING IN EXTENDED REALITY ENVIRONMENTS

(71) Applicant: Snap Inc., Santa Monica, CA (US)

(72) Inventors: Evangelos Chatzikalymnios, Vienna (AT); Markus Diem, Vienna (AT); Gabor Nemeth, Gyor (HU); Thomas Rossi Mel, San Quirino (IT)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 19/319,244

(22) Filed: Sep. 4, 2025

(30) Foreign Application Priority Data

Jul. 31, 2025 (GR) .............................. 20250100586

(51) Int. Cl.
*G06F 3/0346* (2013.01)
*G06T 7/70* (2017.01)
*G06T 19/00* (2011.01)

(52) U.S. Cl.
CPC .............. *G06F 3/0346* (2013.01); *G06T 7/70* (2017.01); *G06T 19/00* (2013.01); *G06T 2219/024* (2013.01)

(58) Field of Classification Search
CPC ......... G06F 3/0346; G06T 7/70; G06T 19/00; G06T 2219/024
See application file for complete search history.

(56) References Cited

U.S. PATENT DOCUMENTS 9,342,929 B2 5/2016 Kamuda et al.
10,445,925 B2 10/2019 Tokubo
10,482,677 B1 11/2019 Iyer et al.
10,748,302 B1 8/2020 Dine et al.
10,908,865 B2 2/2021 Vembar et al.
11,587,255 B1 2/2023 Micusik et al.
2016/0350973 A1 12/2016 Shapira et al.
2017/0358140 A1 12/2017 Kohler et al.
2018/0005429 A1 1/2018 Osman et al.
2020/0380784 A1 12/2020 Iyer et al.
2021/0149190 A1 5/2021 Johnson et al.
2021/0343087 A1* 11/2021 Gomez Gonzalez ... G06F 3/013
2023/0186521 A1 6/2023 Micusik et al.
2023/0393650 A1* 12/2023 Ajaykumar ........... G06T 19/006
(Continued)

FOREIGN PATENT DOCUMENTS

WO WO-2025014944 A1 1/2025

OTHER PUBLICATIONS

"U.S. Appl. No. 18/450,137, Examiner Interview Summary mailed Jul. 28, 2025", 2 pgs.

(Continued)

*Primary Examiner* — Kenneth B Lee, Jr.
(74) *Attorney, Agent, or Firm* — Schwegman Lundberg & Woessner, P.A.

(57) ABSTRACT

Systems and methods described herein relate to collaborative object tracking in extended reality environments. An eXtended reality (XR) device maintains a tracklet for a tracked object and receives an object pose prediction comprising a predicted future pose of the tracked object. The predicted future pose is generated by the tracked object based on sensor data obtained using one or more local sensors of the tracked object. The XR device updates the tracklet using the object pose prediction and associates a real-world object in a field of view of the XR device with the tracked object based on the updated tracklet.

20 Claims, 12 Drawing Sheets

(56) References Cited

U.S. PATENT DOCUMENTS

| | | | | |
|---|---|---|---|---|
| 2024/0242443 | A1* | 7/2024 | Nallabolu | G06V 20/20 |
| 2024/0265661 | A1* | 8/2024 | Mclachlan | G06T 19/006 |
| 2024/0289975 | A1* | 8/2024 | Viehauser | G06T 7/70 |
| 2025/0022162 | A1 | 1/2025 | Fulkerson et al. | |

OTHER PUBLICATIONS

"U.S. Appl. No. 18/450,137, Non Final Office Action mailed Apr. 21, 2025", 21 pgs.

"U.S. Appl. No. 18/450,137, Notice of Allowance mailed Aug. 1, 2025", 7 pgs.

"U.S. Appl. No. 18/450,137, Response filed Jul. 17, 2025 to Non Final Office Action mailed Apr. 21, 2025", 10 pgs.

"International Application Serial No. PCT/US2024/037197, International Search Report mailed Oct. 23, 2024", 4 pgs.

"International Application Serial No. PCT/US2024/037197, Written Opinion mailed Oct. 23, 2024", 6 pgs.

Micusik, Branislav, et al., "Ego-Motion Alignment from Face Detections for Collaborative Augmented Reality", [Online] Retrieved from the Internet: <URL: https://arxiv.org/abs/2010.02153v1>, (Oct. 5, 2020), 25 pgs.

Nakamura, Atsuyuki, et al., "A Mutual Motion Capture System for Face-to-face Collaboration", ICAT-EGVE., (2017).

Tithi, Jesmin Jahan, et al., "Online and Real-time Object Tracking Algorithm with Extremely Small Matrices", arXiv preprint arXiv:2003.12091v2, (Mar. 22, 2021), 5 pgs.

* cited by examiner

COLLABORATIVE OBJECT TRACKING IN EXTENDED REALITY ENVIRONMENTS

CLAIM OF PRIORITY

This application claims the benefit of priority to Greece Patent Application Serial No. 20250100586, filed Jul. 31, 2025, which is incorporated herein by reference in its entirety.

TECHNICAL FIELD

The subject matter disclosed herein generally relates to eXtended Reality (XR) technology. Particularly, but not exclusively, the subject matter relates to object tracking techniques for XR devices.

BACKGROUND

Object detection and object tracking are ongoing challenges in various applications, including XR applications. In XR environments, multiple users often interact within a shared XR space, such as through shared virtual content. Accurate tracking of objects in the XR environment, such as other XR devices within a field of view of an XR device, helps to provide collaborative experiences by supporting proper alignment of virtual content between users. This aids in reducing disorienting visual artifacts that could break immersion and supports the integrity of the XR environment.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
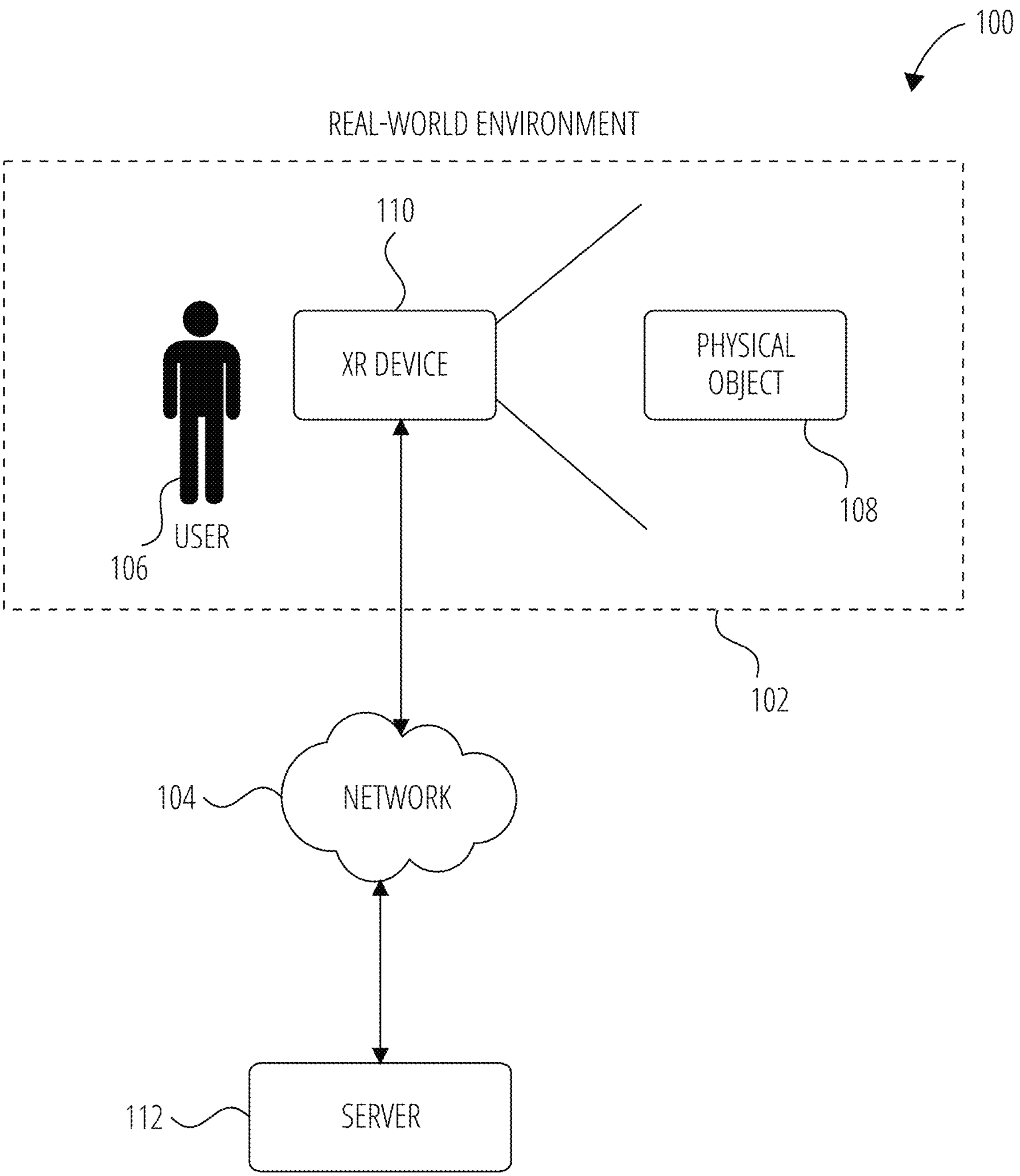
FIG. 1 is a block diagram illustrating a network environment for operating an XR device, according to some examples.

XR devices can operate in multi-agent systems. Agents can include XR devices and/or other devices with tracking and/or communications capabilities, such as mobile devices or wearables. In examples in the present disclosure, where an XR device tracks another agent, the other agent is referred to herein as a "tracked object."

A tracking system of an XR device typically relies on visual detection algorithms that identify objects in each frame and then associate detections with existing object trajectories, or tracks, from previous frames, creating continuous tracking paths referred to as "tracklets." A tracklet is maintained to capture the identity and trajectory information of a specific tracked object by connecting individual observations (e.g., including pose and/or motion data) across a series of timestamps.

The association process in conventional tracking systems can incorporate appearance and motion information into matching cost functions, utilizing algorithms such as the Hungarian algorithm for pairing between detected objects and existing tracklets. Future motion prediction can employ Kalman filters based on historical observations, which estimate where tracked objects will be positioned in subsequent frames.

However, existing techniques present technical challenges. Since each XR device in a multi-agent system conventionally tracks and estimates future poses for all the other agents of interest, the computational complexity of the relevant algorithms scales nonlinearly with the number of tracked objects, creating performance bottlenecks as complexity increases. For example, a conventional process can result in $O(n^2)$ computational complexity where each additional tracked object (O) exponentially increases processing requirements. Moreover, Kalman filters are constrained in their motion modeling and can perform poorly in complex motion patterns, such as when multiple objects in an XR device's field of view move unpredictably or unexpectedly switch places. This can lead to identity switching errors where the tracking system incorrectly matches detected objects with existing tracklets, thereby degrading overall tracking performance.

The subject matter in the present disclosure addresses or alleviates these technical challenges by providing a collaborative approach to object tracking. In various examples described herein, agents in a multi-agent system leverage other agents' internal pose predictions that are based on each other agent's own (e.g., internal or on-board) sensor data. For example, a given XR device that tracks one or more tracked objects leverages each tracked object's prediction capabilities stemming from access to internal sensor data, such as Inertial Measurement Unit (IMU) readings and other motion information that external observers cannot access, and can provide superior predictions due to such additional information.

In this way, computational load is distributed among the agents themselves rather than relying on centralized and duplicative external prediction calculations for all objects, facilitating a reduction in computational complexity from $O(n^2)$ to $O(n)$ and helping to improve system scalability. For example, each agent predicts only its own future pose and transmits the future pose to other agents, while the agent receives predicted future poses from the other agents.

Moreover, the association accuracy problem is alleviated by using object pose predictions to update tracklets and associate real-world objects with tracked objects, where the object pose predictions are generated by the tracked objects themselves. This approach can avoid issues inherent in many Kalman-filter based predictions, helping an XR device to disambiguate between multiple detected real-world objects in the real-world environment and reduce the risk of identity switching errors.

An example method is performed by an XR device. The example method includes maintaining a tracklet for a tracked object, such as another XR device or another agent with its own tracking sensors.

The XR device receives, from the tracked object, an object pose prediction comprising a predicted future pose of the tracked object. The predicted future pose can be generated by the tracked object at a first time point for a future timestamp, which the XR device then uses for calculations related to that future timestamp.

The XR device can use the object pose prediction from the tracked object to update the relevant tracklet and to associate the tracklet with a real-world object detected in a real-world environment. For example, based on the pose predictions shared by the tracked object, the XR device can accurately match the tracked object with a real-world object in its field of view (or even outside of its field of view).

The term "device pose prediction," as used herein, refers to a device's own pose prediction, generated using its own (e.g., on-board or local) sensors. For example, the XR device uses its own sensors to generate a prediction for its own pose at a future timestamp. The term "object pose prediction," as used herein, refers to a pose prediction that was generated by another object or agent. For example, the XR device receives an object pose prediction from the tracked object after the tracked object uses its own (local) sensors to generate the object pose prediction.

A device pose prediction or object pose prediction may include data describing spatial position and/or orientation of an object at a future timestamp. A pose may be provided in the form of a six-degree-of-freedom pose representation, often referred to as a 6DoF pose, that includes position coordinates and angular orientation data. A device pose prediction or object tracking data can also include motion data, such as velocity or acceleration data.

For example, the XR device receives an object pose prediction from the tracked object, specifying both translational and rotational components of the predicted future pose, generated using a combination of sensor data such as IMU readings (e.g., accelerometer measurements or gyroscope data) and images captured from the perspective of the tracked object that are exclusively accessible to the tracked object.

These pose predictions may thus be communicated between agents in a multi-agent system to facilitate improved object tracking and association processes. In some examples, the object pose prediction includes a prediction for the internal Visual-Inertial Odometry (VIO) state of another agent, which may include an estimation of pose and/or motion (e.g., velocity or acceleration) at a future timestamp.

In some examples, the associating of the real-world object with the tracked object comprises using the object pose prediction to disambiguate between multiple detected real-world objects in the real-world environment. Each of the multiple detected real-world objects is associated with a tracking identifier and the example method helps the XR device to maintain the correct association between a tracking identifier and an object.

The XR device may generate a device pose prediction comprising a predicted future pose of the XR device, and transmit the device pose prediction to the tracked object (e.g., to another XR device), allowing that object to maintain a tracklet for the XR device. Thus, pose information can be shared bidirectionally in a multi-agent system.

In some examples, the method further includes establishing a shared coordinate system between XR devices. An XR device may use the shared coordinate system, along with the shared pose predictions, to accurately align virtual content that is intended to be simultaneously presented by multiple XR devices as part of a shared experience.

An XR device can use the object pose prediction it receives from a tracked object to position virtual content. For example, the method includes using the object pose prediction to determine a suitable location for overlaying virtual content onto the tracked object (from the perspective of the XR device) and rendering the virtual content, via a display of the XR device, to be perceived by a user of the XR device at that location.

The XR device can also use the object pose prediction for other detection and/or tracking related operations. For example, the XR device captures one or more images of the real-world environment and processes the one or more images to detect a real-world object corresponding to the tracked object. The XR device generates a bounding box relative to the real-world object and uses the predicted future pose of the tracked object to localize the real-world object within the bounding box.

The example method can include establishing a wireless communication link between the XR device and the tracked object, wherein the object pose prediction is transmitted to the XR device directly from the tracked object via the wireless communication link. In some examples, the establishing of the wireless communication link includes establishing a pose sharing session in which pose data is shared bidirectionally between the XR device and the tracked object via the wireless communication link.

Pose data can be continuously shared (e.g., streamed) or periodically shared. Pose data can be shared in response to requests from other devices, or in response to commencement of a secure pose sharing session.

In some examples, a tracked object generates multiple predicted future poses for the same future timestamp, allowing for selection of a subset thereof and/or refinement of the predicted future pose. For example, the tracked object continuously estimates its predicted future pose and transmits it to the XR device upon request or at a predetermined moment, allowing for more accurate estimates. The XR device may receive multiple predictions for the same timestamp and use at least one of them (e.g., the latest version) for object association.

Systems and methods described herein may allow an XR device to run a visual object tracker less frequently, or even deactivate the visual object tracker for certain periods during multi-agent sessions, while still being able to track the other agents. For example, the XR device initializes the visual object tracker, processes images of the environment to detect the relevant agents participating in a multi-agent session and/or to establish a full coordinate frame, after which the XR device stops running the visual object tracker while simply using the object pose predictions it continuously receives from the other agents to maintain their tracklets and thus keep track of their trajectories. This can reduce computing resources consumed by the XR device during a multi-agent session.

The collaborative pose prediction system described herein provides a practical application that can help to improve tracking accuracy and/or reduce computational resources consumed in computing systems. Examples described in the present disclosure facilitate more accurate object-to-tracklet associations by using object pose predictions generated by tracked objects themselves based on sensor data obtained using local sensors, which helps to address the technical problem of identity switching that occurs when traditional external motion estimation methods incorrectly associate detected objects with existing tracklets during unpredictable motion scenarios. This improved association accuracy can help to enhance the overall performance and reliability of tracking systems in XR applications.

Additionally, the subject matter described herein provides practical applications for real-time rendering systems by facilitating the use of shared pose predictions for rendering virtual assets without additional latency. Examples described in the present disclosure can help to address current technical limitations where rendered virtual content lags behind tracked users by providing more accurate and timely position information through collaborative prediction sharing. This approach seeks to improve the quality and responsiveness of virtual content presentation in multi-user XR environments.

The term "augmented reality" (AR) is used herein to refer to an interactive experience of a real-world environment where physical objects or environments that reside in the real world are "augmented," modified, or enhanced by computer-generated digital content (also referred to as virtual content, synthetic content, or digital effects). AR can also refer to a system that enables a combination of real and virtual worlds, real-time interaction, and three-dimensional (3D) registration of virtual and real objects. A user of an AR system can perceive virtual content that appears to be attached or interact with a real-world physical object. The term "AR application" is used herein to refer to a computer-operated application that enables an AR experience.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment. While examples described in the present disclosure focus primarily on XR devices that provide an AR experience, it will be appreciated that aspects of the present disclosure may also be applied to VR.

FIG. 1 is a network diagram illustrating a network environment 100 suitable for operating an XR device 110, according to some examples. The network environment 100 includes an XR device 110 and a server 112, communicatively coupled to each other via a network 104. The XR device 110 and the server 112 may each be implemented in a computer system, in whole or in part, as described below with respect to FIG. 12. The server 112 may be part of a network-based system. For example, the network-based system may be or include a cloud-based server system that provides additional information, such as virtual content (e.g., 3D models of virtual objects, or digital effects to be applied, for example, as virtual overlays onto images depicting real-world scenes) to the XR device 110.

A user 106 operates the XR device 110. The user 106 may be a human user (e.g., a human being), a machine user (e.g., a computer configured by a software program to interact with the XR device 110), or any suitable combination thereof (e.g., a human assisted by a machine or a machine supervised by a human). The user 106 is not part of the network environment 100, but is associated with the XR device 110. For example, where the XR device 110 is a head-wearable apparatus, the user 106 wears the XR device 110 during a user session.

The XR device 110 may have different display arrangements. In some examples, the display arrangement may include a screen that displays what is captured with a camera of the XR device 110. In other examples, the display of the device may be transparent or semi-transparent (e.g., with virtual content projected onto transparent or semi-transparent elements). In other examples, the display may be non-transparent and wearable by the user to cover the field of vision of the user.

The user 106 operates an application of the XR device 110, referred to herein as an AR application. The AR application may be configured to provide the user 106 with an experience triggered or enhanced by a physical object 108, such as a two-dimensional physical object (e.g., a picture), a three-dimensional physical object (e.g., a statue), a location (e.g., at factory), or any references (e.g., perceived corners of walls or furniture, QR codes) in the real-world physical environment. For example, the user 106 may point a camera of the XR device 110 to capture an image of the physical object 108 and a virtual overlay may be presented over the physical object 108 via the display. Experiences may also be triggered or enhanced by a hand or other body part of the user 106, e.g., the XR device 110 may detect and respond to hand gestures.

The XR device 110 includes tracking components (not shown in FIG. 1). The tracking components track the pose (e.g., position, orientation, and location) of the XR device 110 relative to the real-world environment 102 using image sensors (e.g., depth-enabled 3D camera, and image camera), inertial sensors (e.g., gyroscope, accelerometer, or the like), wireless sensors (e.g., Bluetooth™ or Wi-Fi™), a Global Positioning System (GPS) sensor, and/or audio sensor to determine the location of the XR device 110 within the real-world environment 102.

In some examples, the physical object 108 is another XR device or other object that has its own tracking capabilities. For example, the XR device 110 tracks and communicates with another XR device to provide a shared experience to their respective users.

In some examples, the server 112 may be used to detect and identify the physical object 108 based on sensor data (e.g., image and depth data) from the XR device 110, and determine a pose of the XR device 110 and the physical object 108 based on the sensor data. The server 112 can also generate a virtual object based on the pose of the XR device 110 and the physical object 108.

In some examples, the server 112 communicates a virtual object to the XR device 110. The XR device 110 or the server 112, or both, can also perform image processing, object detection and object tracking functions based on images captured by the XR device 110 and one or more parameters internal or external to the XR device 110. The object recognition, tracking, and AR rendering can be performed on either the XR device 110, the server 112, or a combination between the XR device 110 and the server 112. Accordingly, while certain functions are described herein as being performed by either an XR device or a server, the location of certain functionality may be a design choice. For example, it may be technically preferable to deploy particular technology and functionality within a server system initially, but later to migrate this technology and functionality to a client installed locally at the XR device where the XR device has sufficient processing capacity.

The network 104 may be any network that enables communication between or among machines (e.g., server 112), databases, and devices (e.g., XR device 110). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
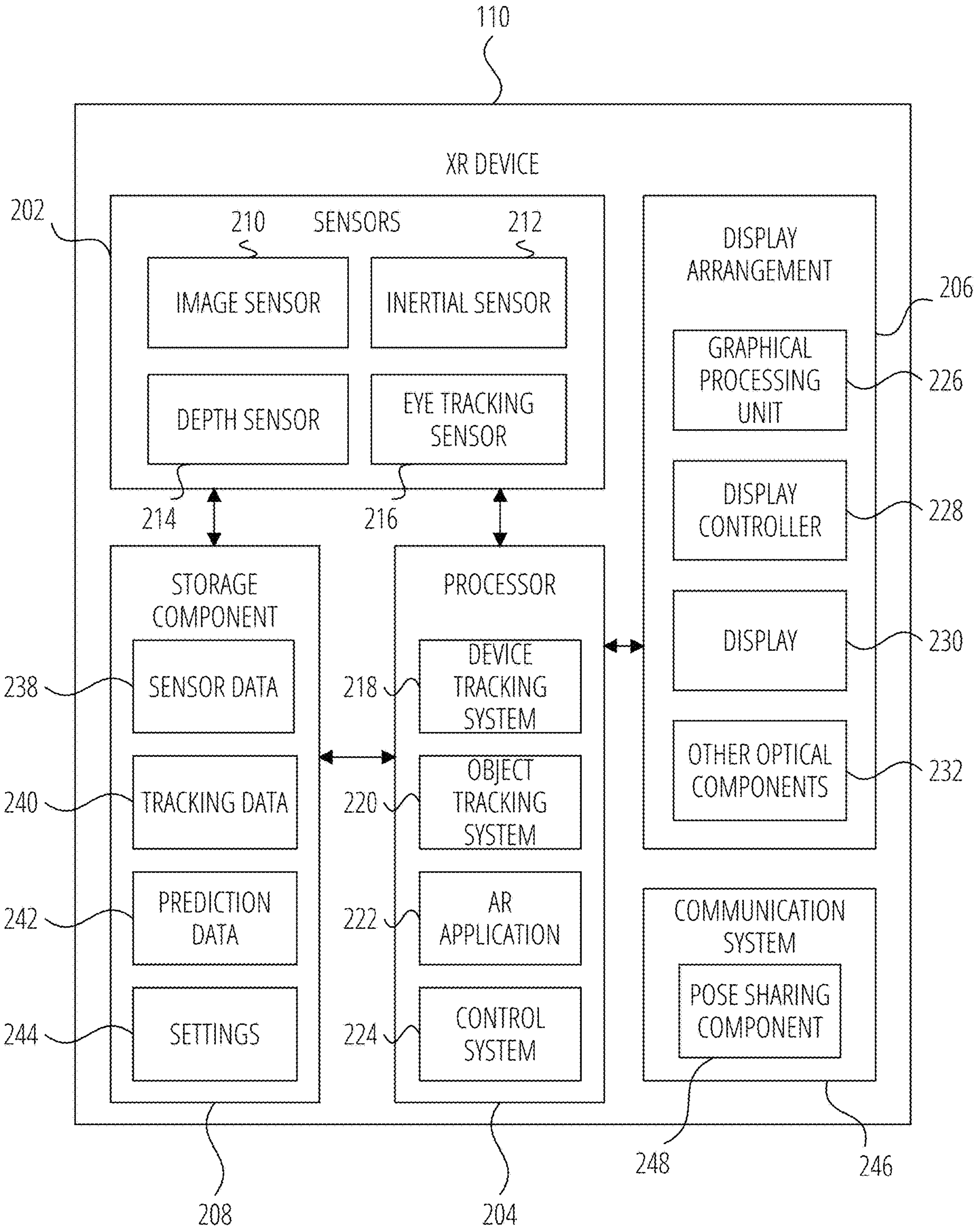
FIG. 2 is a block diagram illustrating components of an XR device, according to some examples.

FIG. 2 is a block diagram illustrating modules (e.g., components, parts, or systems) of the XR device 110, according to some examples. The XR device 110 includes sensors 202, a processor 204, a display arrangement 206, a storage component 208, and a communication system 246. It will be appreciated that FIG. 2 is not intended to provide an exhaustive indication of modules of the XR device 110.

The sensors 202 include at least one image sensor 210, at least one inertial sensor 212, at least one depth sensor 214, and at least one eye tracking sensor 216. The image sensor 210 may include, for example, one or a combination of a color camera, a thermal camera, a depth sensor, and one or multiple grayscale, global shutter tracking cameras.

The inertial sensor 212 includes a combination of a gyroscope, accelerometer, and a magnetometer. In some examples, the inertial sensor 212 includes one or more IMUs. An IMU enables tracking of movement of a body by integrating the acceleration and the angular velocity measured by the IMU. The term "IMU" can refer to a combination of accelerometers and gyroscopes that can determine and quantify linear acceleration and angular velocity, respectively. The values obtained from the gyroscopes of the IMU can be processed to obtain the pitch, roll, and heading of the IMU and, therefore, of the body with which the IMU is associated. Signals from the accelerometers of the IMU also can be processed to obtain velocity and displacement.

The depth sensor 214 may include one or a combination of a structured-light sensor, a time-of-flight sensor, passive stereo sensor, and an ultrasound device. The eye tracking sensor 216 is configured to monitor the gaze direction of the user, providing data for various applications, such as adjusting the focus of displayed content or adjusting display panels, as described herein. The XR device 110 may include one or multiple of these sensors, e.g., infrared eye tracking sensors, corneal reflection tracking sensors, or video-based eye-tracking sensors.

Other examples of sensors 202 include a proximity or location sensor (e.g., near field communication, GPS, Bluetooth™, Wi-Fi™), an audio sensor (e.g., a microphone), or any suitable combination thereof. It is noted that the sensors 202 described herein are for illustration purposes and the sensors 202 are thus not limited to the ones described above.

The processor 204 executes or implements a device tracking system 218, an object tracking system 220, an AR application 222, and a control system 224.

The device tracking system 218 estimates a pose of the XR device 110. For example, the device tracking system 218 uses data from the image sensor 210 and the inertial sensor 212 to track a pose of the XR device 110 relative to a frame of reference (e.g., real-world environment 102). In some examples, the device tracking system 218 uses the sensor data 238 to determine the 3D or 6DoF pose of the XR device 110. This can include determined or estimated orientation and position of the XR device 110 in relation to the user's real-world environment 102.

The device tracking system 218 continually gathers and uses updated sensor data describing movements of the XR device 110 to determine updated poses of the XR device 110 that indicate changes in the relative position and orientation of the XR device 110 from the physical objects in the real-world environment 102. The device tracking system 218 provides the pose of the XR device 110 to a graphical processing unit 226 of the display arrangement 206.

A "SLAM" (Simultaneous Localization and Mapping) system may be used to understand and map a physical environment in real-time. This allows, for example, an XR device to accurately place digital objects in the real world and track their position as a user moves and/or as objects move. The XR device 110 may include a "VIO" (Visual-Inertial Odometry) system that combines data from an IMU and a camera to estimate the position and orientation of an object in real-time. In some examples, a VIO system may form part of a SLAM system, e.g., to perform the "Localization" function of the SLAM system.

The XR device 110 can generate a device pose prediction by using sensor data to estimate the future pose of the XR device 110 at a specified timestamp. This prediction typically relies on sensor fusion techniques that integrate high-frequency inertial measurements from the IMU (e.g., accelerations and angular velocities) with visual information from the image sensors. Classical approaches such as Kalman filters, extended Kalman filters (EKF), or unscented Kalman filters (UKF) may be used to propagate the current pose forward in time, refining it using the expected dynamics of the device and periodic visual corrections. These methods can allow the XR device 110 to anticipate motion over short time horizons, reducing latency and maintaining alignment between virtual and real-world content during rendering.

In addition to traditional techniques, machine learning (ML) methods can be applied to estimate pose or enhance pose prediction. Recurrent neural networks (RNNs), long short-term memory networks (LSTMs), and/or transformer-based models can be used to learn temporal dependencies in motion data and make predictions based on patterns observed in past movements. Convolutional neural networks (CNNs) can be applied to extract spatial features from visual inputs, which are then combined with inertial data for pose estimation. An XR device 110 can use end-to-end learning-based sensor fusion models that learn to combine multiple sensor modalities. Hybrid approaches that integrate ML with classical methods can be employed, leveraging strengths of both to improve robustness and/or performance in potentially challenging or dynamic environments.

In some examples, the XR device 110 shares its device pose predictions with other devices or objects via a pose sharing component 248 of the communication system 246, as discussed further below.

The object tracking system 220 enables the tracking of physical objects, such as a user's hand or other real-world items (e.g., the physical object 108). The object tracking system 220 may be implemented as a computer-operated application or system that leverages one or more image sensors (e.g., cameras) to capture and analyze images. From these images, the object tracking system 220 identifies and tracks visual features over time. In some cases, the object tracking system 220 builds a model of the environment based on these tracked features, providing more consistent recognition and tracking of objects across multiple frames.

In some examples, a visual object tracker is a component within the object tracking system 220 that estimates the location of a target object across a sequence of frames. It typically uses cues such as the object's appearance, motion patterns, and distinct landmarks to maintain consistent tracking. Object trackers may incorporate machine learning models, including neural networks trained on labeled datasets, to improve accuracy and robustness. These models help distinguish the target object from background elements and adapt to changes in scale, lighting, or partial occlusion during a user session.

The object tracking system 220 may utilize tracklets—sequences of linked object detections across consecutive frames—to maintain continuity in tracking. Each tracklet is associated with a specific object and helps in resolving ambiguities caused by occlusions, rapid movement, or temporary loss of visual features. By associating tracklets with identified objects, the object tracking system 220 can more accurately predict object trajectories and/or re-identify objects when they reappear in the camera's field of view. In some examples, the object tracking system 220 utilizes tracking data that includes shared pose data from other objects to associate detected objects with existing tracklets.

The control system 224 may provide a coordination module that manages overall operation and configuration of other components or modules. The control system 224 may access settings to configure operational parameters for various components and coordinate data flow between processing modules. In some examples, the control system 224 manages the establishment of communication links with other agents (e.g., XR devices) for collaborative tracking sessions and controls the activation of pose sharing functionality. The control system 224 may coordinate shared coordinate systems and timing synchronization between multiple devices and manage the transition between different tracking modes based on system conditions and user requirements.

The AR application 222 may retrieve a virtual object (e.g., 3D object model) based on an identified physical object 108 or physical environment (or other real-world feature), or retrieve a digital effect to apply to the physical object 108. The graphical processing unit 226 causes display of the virtual object, digital effect, or the like. The AR application 222 includes a local rendering engine that generates a visualization of a virtual object overlaid (e.g., superimposed upon, or otherwise displayed in tandem with) on an image of the physical object 108 (or other real-world feature) captured by the image sensor 210. A visualization of the virtual object may be manipulated by adjusting a position of the physical object or feature (e.g., its physical location, orientation, or both) relative to the image sensor 210. Similarly, the visualization of the virtual object may be manipulated by adjusting a pose of the XR device 110 relative to the physical object or feature.

The display arrangement 206 can further include a display controller 228, a display 230, and other optical components 232. The display 230 can include a screen or panel configured to display images generated by the processor 204 or the graphical processing unit 226. In some examples, the display 230 may be transparent or semi-transparent so that the user 106 can see through the display 230. The display 230 may be offset from the gaze path of the user and the other optical components 232 may direct light from the display 230 into the gaze path. The other optical components 232 may include, for example, one or more mirrors, one or more lenses, and one or more beam splitters.

Referring again to the graphical processing unit 226, the graphical processing unit 226 may include a render engine that is configured to render a frame of a 3D model of a virtual object based on the virtual content provided by the AR application 222 and the pose of the XR device 110 (and, in some cases, the position of a tracked object). In other words, the graphical processing unit 226 uses the pose of the XR device 110 and/or poses or estimated poses of other objects to generate frames of virtual content to be presented on the display 230. For example, the graphical processing unit 226 uses the one or more poses to render a frame of the virtual content such that the virtual content is presented at an orientation and position in the display 230 to properly augment the user's reality. As an example, the graphical processing unit 226 may use both device pose predictions and object pose predictions to render a frame of virtual content such that, when presented on the display 230, the virtual content is caused to be presented to a user so as to overlap with a physical object in the user's real-world environment 102. The graphical processing unit 226 can generate updated frames of virtual content based on updated tracking data, which reflects changes in the position and orientation of the user in relation to physical objects in the user's real-world environment 102.

The graphical processing unit 226 transfers the rendered frame to the display controller 228. The display controller 228 is positioned as an intermediary between the graphical processing unit 226 and the display 230, receives the image data (e.g., rendered frame) from the graphical processing unit 226, re-projects the frame (by performing a warping process) based on a latest pose of the XR device 110 (and, in some cases, object tracking pose forecasts or predictions), and provides the re-projected frame to the display 230.

It will be appreciated that, in examples where an XR device includes multiple displays, each display may have a dedicated graphical processing unit and/or display controller. It will further be appreciated that where an XR device includes multiple displays, e.g., in the case of AR glasses or any other AR device that provides binocular vision to mimic the way humans naturally perceive the world, a left eye display arrangement and a right eye display arrangement may deliver separate images or video streams to each eye. Where an XR device includes multiple displays, steps may be carried out separately and substantially in parallel for each display, in some examples, and pairs of features or components may be included to cater for both eyes.

For example, an XR device may capture separate images for a left eye display and a right eye display (or for a set of right eye displays and a set of left eye displays), and render separate outputs for each eye to create a more immersive experience and to adjust the focus and convergence of the overall view of a user for a more natural, three-dimensional view. Thus, while a single set of display arrangement components may be discussed to describe some examples, e.g., display layers and other optical components that direct images to one eye, similar techniques may be applied to cover both eyes by providing a further set of display arrangement components.

The storage component 208 may store various data, such as sensor data 238, tracking data 240, prediction data 242, and settings 244. In some examples, the sensor data 238 comprises raw and processed information collected from the sensors 202 integrated within the XR device 110. In some examples, sensor data 238 includes image data from image sensors, depth information from depth sensors, inertial measurements from inertial sensors, and eye tracking information from eye tracking sensors. The sensor data 238 may contain spatial position and orientation measurements, motion vectors, acceleration data, and visual feature information captured from the real-world environment. In some examples, sensor data 238 provides the foundational input for pose prediction generation by the device tracking system 218 and sharing thereof by the pose sharing component 248. The sensor data 238 may be timestamped and synchronized across multiple sensor modalities.

In some examples, tracking data 240 comprises processed information related to the ongoing tracking of objects and the XR device itself within the real-world environment. In some examples, tracking data 240 includes tracklet information that represents the continuous tracking history of objects across multiple time frames, including spatial position and orientation data over time. The tracking data 240 may contain object association information, tracking confidence scores, and/or motion trajectory data for tracked objects. In some examples, tracking data 240 stores the results of object detection and/or association operations performed by the object tracking system 220. The tracking data 240 may be updated continuously as new sensor data is processed and new object pose predictions are received via the pose sharing component 248.

A tracklet can maintain the identity and trajectory information of a tracked object by connecting individual pose observations or detections from successive timestamps, thereby establishing a coherent path of movement through time and space. For example, a tracklet may comprise a series of pose data points captured at a sequence timestamps, where each data point includes spatial position and orientation information for the same tracked object. A tracklet may be updated when new object detections are associated with the existing track, and may include metadata such as tracking identifiers, confidence scores, and/or temporal information.

In some examples, prediction data 242 comprises processed pose prediction information that facilitates improved object tracking and association operations. In some examples, prediction data 242 includes device pose predictions and/or object pose predictions. In some examples, prediction data 242 stores device pose predictions generated by the XR device 110 itself for transmission to other devices.

In some examples, the settings 244 include configuration parameters and operational preferences that control the behavior of various components within the XR device 110. In some examples, settings 244 include tracking algorithm parameters, pose sharing session configurations, and communication protocol settings for collaborative tracking operations. The settings 244 may contain preferences for tracking sensitivity, prediction accuracy thresholds, and network communication parameters. In some examples, settings 244 stores calibration data for sensors 202 and configuration options for the pose sharing component 248, including parameters for pose prediction generation and sharing frequency. The settings 244 may be accessed by the control system 224 to configure system behavior and may be updated based on user input or system performance optimization requirements.

The communication system 246 allows the XR device 110 to communicate with remote and co-located devices, including remote servers and other devices in the immediate environment of the XR device 110. As mentioned, the communication system 246 includes a pose sharing component 248. The pose sharing component 248 can implement bidirectional sharing of pose data, including predicted future poses. In some examples, the pose sharing component 248 takes device pose predictions generated using the local sensors (e.g., one or more of the sensors 202) of XR device 110 and transmits these predictions to other objects via the communication system 246. The pose sharing component 248 also receives object pose predictions from one or more other objects (e.g., other XR devices), where these predictions comprise predicted future poses generated by those objects using their own local sensor data.

In some examples, the pose sharing component 248 establishes wireless communication links between devices and manages bidirectional pose data sharing sessions. XR devices can communicate directly with each other using short-range wireless protocols such as Bluetooth or Wi-Fi Direct, without the need for intermediary infrastructure. Certain communications can also travel via backend components over the Internet using protocols such as HTTPS or WebRTC. The communication system 246 incorporates suitable communication modules for such communications. This can facilitate, for example, synchronization of shared spatial maps, session states, pose data, and environmental data across distributed users, supporting consistent and coordinated interactions in collaborative XR environments.

In some examples, the pose sharing component 248 uses predetermined data structures for pose sharing. For example, pose data can be represented using the SE(3) pose format (Special Euclidian group in 3D), providing a rigid body transformation in 3D space, representing both the position and orientation of an object. Mathematically, an SE(3) pose is typically expressed as a 4×4 transformation matrix, including a rotation matrix for orientation and a translation vector for position. The data structures can also include other data such as timestamps, device or tracking identifiers, and/or motion data.

The server 112 and/or XR device 110 can also implement a compliance system to facilitate compliance with data privacy and other regulations, including for example the California Consumer Privacy Act (CCPA), General Data Protection Regulation (GDPR), and Digital Services Act (DSA). The compliance system comprises several components that address data privacy, protection, and user rights, ensuring a secure environment for user data. A data collection and storage component securely handles user data, using encryption and enforcing data retention policies. A data access and processing component provides controlled access to user data, ensuring compliant data processing and maintaining an audit trail. A data subject rights management component facilitates user rights requests in accordance with privacy regulations, while the data breach detection and response component detects and responds to data breaches in a timely and compliant manner. The compliance system also incorporates opt-in/opt-out management and privacy controls across the digital interaction system, empowering users to manage their data preferences. The compliance system is designed to handle sensitive data by obtaining explicit consent, implementing strict access controls and in accordance with applicable laws.

One or more of the modules described herein may be implemented using hardware (e.g., a processor of a machine) or a combination of hardware and software. For example, a module described herein may configure a processor to perform the operations described herein for that module. Moreover, two or more of these modules may be combined into a single module, and the functions described herein for a single module may be subdivided among multiple modules. Furthermore, according to various examples, modules described herein as being implemented within a single machine, system, or device may be distributed across multiple machines, systems, or devices.

Figure 3:
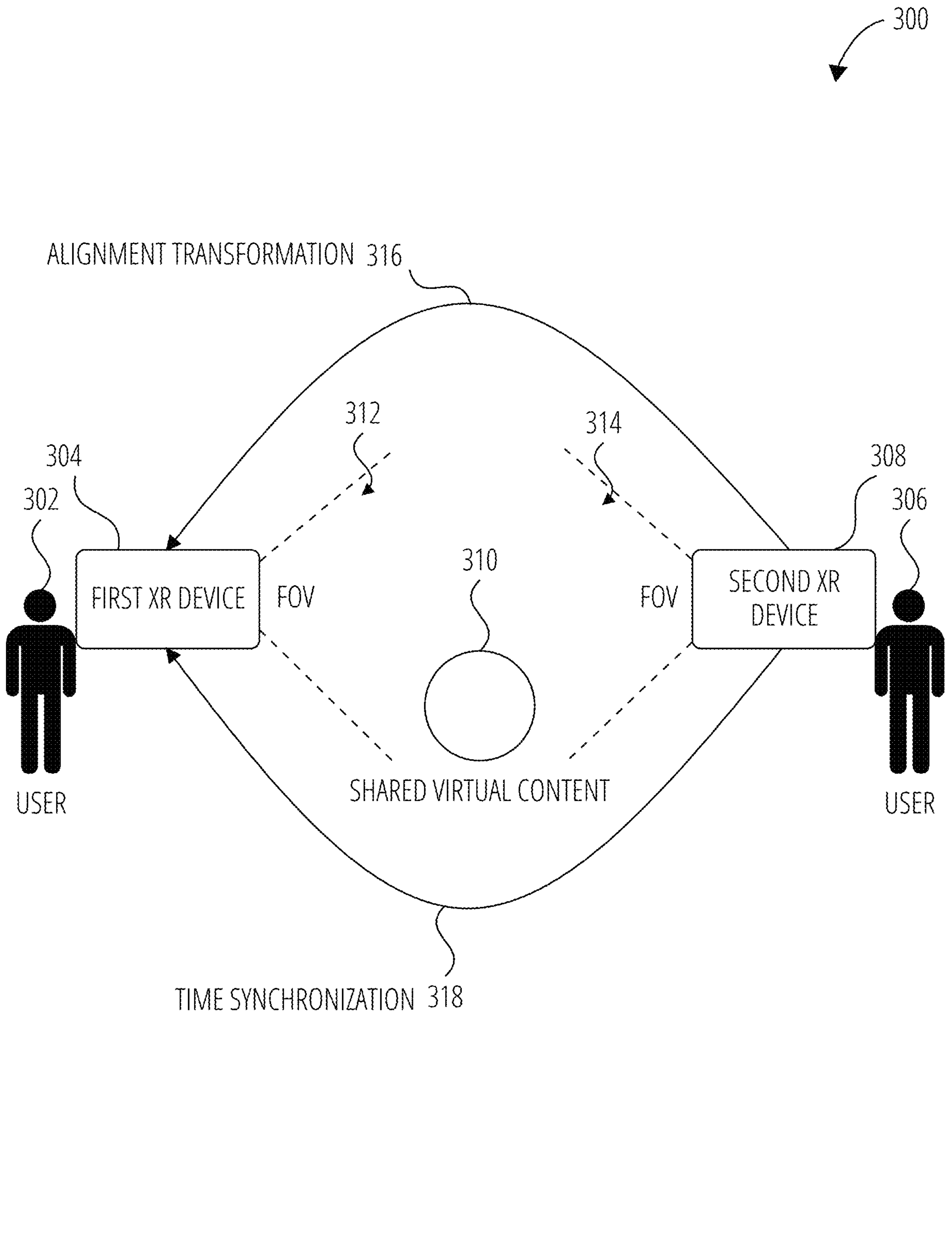
FIG. 3 is a diagram illustrating a shared XR experience in which a shared coordinate system is established between a first XR device and a second XR device, and in which collaborative object tracking is performed, according to some examples.

FIG. 3 shows a shared XR experience 300, according to some examples. The shared XR experience 300 is provided between a user 302 of a first XR device 304 and a user 306 of a second XR device 308, according to some examples. The first XR device 304 and the second XR device 308 are both head-mounted AR devices that may include one or more components of the XR device 110 described with reference to FIG. 1 and FIG. 2. Accordingly, reference is made below to certain components shown in FIG. 2.

The shared experience of FIG. 3 is a shared AR experience in which shared virtual content 310 is presented in a field of view 312 of the first XR device 304 and in a field of view 314 of the second XR device 308. The shared virtual content 310 can be overlaid onto real-world objects in the real-world environment, such as a room or a park, in which the user 302 and the user 306 are located.

The user 302 and the user 306 may be able to interact with the shared virtual content 310, e.g., through hand gestures. For example, the user 302 and the user 306 are standing at opposite sides of a table and manipulate a virtual object that is presented to appear on a top surface of the table (with the user 302 and the user 306 viewing the virtual object from opposite sides).

The first XR device 304 and second XR device 308 can be regarded as a multi-agent system. To this end, the first XR device 304 and the second XR device 308 can track each other's poses such that virtual content is properly positioned and aligned and the shared XR experience 300 is synchronized and coordinated. For example, the user 302 can "drag" and "pass" the virtual object to the user 306. The first XR device 304 understands the pose of the second XR device 308, helping it to position virtual content relative to the user 306.

In FIG. 3, the first XR device 304 and the second XR device 308 are communicatively coupled to each other to enable data sharing. For example, the first XR device 304 may use the communication system 246 to establish a wireless link with the second XR device 308 for data sharing. The first XR device 304 can, in some examples, access 6DoF poses of the second XR device 308 via the wireless link and the pose sharing component 248 to track a pose trajectory of the second XR device 308 while the user 306 is moving (relative to the first XR device 304). Pose data can include predicted future poses. In some examples, the first XR device 304 and/or the second XR device 308 may be connected to a server, e.g., the server 112. Data sharing may thus occur directly (device-to-device) or via the server, or through a combination thereof.

Spatial and temporal alignment may be performed. FIG. 3 shows that the first XR device 304 may perform ego-motion alignment, which involves determining an alignment transformation 316 to align a local coordinate system of the first XR device 304 with a local coordinate system of the second XR device 308. FIG. 3 further shows that time synchronization 318 may be performed.

In some examples, AR experiences are designed to operate in devices that have their poses expressed in the same coordinate system and time-stamped from the same (or an aligned) clock. This provides for a shared coordinate system and synchronized timing.

Ego-motion alignment can be performed to align the local coordinate systems and establish a shared coordinate system. When performing ego-motion alignment, one XR device may be a "host" with one or more "clients" connecting to the host. For example, the first XR device 304 may be the host, with the first XR device 304 determining a transformation required to align the local coordinate system of the second XR device 308 with that of the first XR device 304.

In some examples, the first XR device 304 and the second XR device 308 may scan a common marker or anchor point as part of ego-motion alignment. In such cases, both the first XR device 304 and the second XR device 308 may recognize a reference or anchor point in the real-world environment (e.g., via a camera and/or other sensor) and align their respective coordinate systems to the reference point. The reference or anchor point may define a point in a global or reference coordinate system. In other examples, where both the first XR device 304 and the second XR device 308 use a mapping system, such as a SLAM system, in the same real-world environment, they can share and align their maps to create the common or shared coordinate system.

Another option for ego-motion alignment involves tracking, by one XR device, a visual feature (or multiple visual features) of the wearer of the other XR device. This option can be referred to as user-in-the-loop ego-motion alignment. At a high level, the goal of user-in-the-loop ego-motion alignment may be to solve for an unknown transformation into a common or shared coordinate system. An XR device may know the 6DoF poses of the other XR device and capture observations to track the visual feature of the wearer of the other XR device. By knowing the 6DoF pose trajectory of the other XR device and also tracking the visual feature, the unknown transformation is solvable. Different methods may be used to observe and track the visual feature on the other wearer. For example, the first XR device 304 (or each XR device 304, 308) may run a face detector that tracks the face of the other wearer. The face detector may utilize a suitable computer vision algorithm, such as one or more neural networks, or an eigen face technique. Each XR device 304, 308 may also run an ego-pose tracker, such as a VIO pose tracker, a SLAM system, or both, and the pose trackers of the XR devices 304, 308 may be gravitationally aligned. For the time synchronization 318, the clocks of the first XR device 304 and the second XR device 308 may be synchronized using, for example, Network Time Protocol (NTP), or through a time alignment algorithm that seeks to find an optimal or near-optimal time offset, an example of which is described below.

In one example of a time alignment algorithm, the first XR device 304 may determine the time offset with the second XR device 308 by globally matching observations (e.g., based on images) captured by the first XR device 304 to poses of the second XR device 308 using different possible (e.g., candidate) time offsets, and identifying one of the possible time offsets as providing the best or most promising solution to an ego-motion alignment problem.

For example, a plurality of different candidate time offsets are selected and simulated to determine which of the candidate time offsets provides the best match between an estimated trajectory (that is based on observations of features captured in images) and the pose trajectory received from the second XR device 308. In some examples, two assumptions may be utilized to allow the technique converges to a solution. The first assumption may be that trajectories are rigid, and the second assumption may be that time is constant (e.g., no clock drift). This may allow for regarding an on-device measured trajectory (e.g., VIO/SLAM based) and a visually observed trajectory (observed from the other device) as two respective signals to be aligned with each other. By globally offsetting time (e.g., shifting the measured trajectory in time), it is possible to preserve features that allow for aligning of these signals.

For each of the candidate time offsets, the first XR device 304 can match the image-based observations of a particular visual feature with corresponding poses in the pose trajectory of the second XR device 308 (which correspond specifically for the given time offset). The first XR device 304 then identifies which one of the candidate time offsets provides the highest correlation between the image-based observations and the pose trajectory of the second XR device 308. The first XR device 304 can perform or simulate user-in-the-loop ego-motion alignment for each of the candidate time offsets, and in each case assumes that the particular candidate time offset is the actual "time delta" between the first XR device 304 and the second XR device 308 (as opposed to assuming that the clocks of first XR device 304 and the second XR device 308 are already synchronized when performing user-in-the-loop ego-motion alignment).

In some examples, in each simulation, the first XR device 304 uses the given candidate time offset as the "actual" time offset for purposes of the simulation and generates an alignment transformation that is valid for that candidate time offset. For example, a first candidate time offset may be 1 second and a second candidate time offset may be 0.8 seconds. The first XR device 304 uses 1 second as the time offset between the first clock and the second clock, matches observations to time-corresponding poses of the second XR device 308 based on the 1-second time offset, and calculates a first alignment transformation using user-in-the-loop ego-motion alignment. The first XR device 304 does the same for the 0.8-second time offset and calculates a second alignment transformation. The first XR device 304 proceeds with this process and then compares the results to find an optimal or near-optimal solution that indicates the actual time offset.

The first XR device 304 may run a simulation for different candidate time offsets using a grid-search type approach to converge to an optimal or near-optimal solution. For example, as part of the grid-search, the first XR device 304 may simulate 0, 0.25, 0.5, 1, 1.5, and 2 second time offsets, respectively. Then, the first XR device 304 performs a second run with a finer grid around the best solution, e.g., 0.125 and 0.375 seconds, if 0.25 was the best solution in the first run. This process may continue until an optimal or satisfactory solution is found. The XR device 304 may utilize heuristics to determine whether to accept a solution or not. If a solution is not accepted, the XR device 304 may wait for more observations to be obtained and retry the search to find a new solution (that may or may not be accepted). The heuristics may include, for example: the grid has a distinct peak, the error is below a certain threshold, or enough inliers (e.g., observations that support the solution) are present.

A processor of the first XR device 304 may implement a solver that executes to converge to the solution. The simulation performs matching globally, which means that it uses all poses in a given pose trajectory and all image-based observations offset relative to the given pose trajectory by the relevant candidate time offset.

In some examples, the shared XR experience 300 implements a collaborative object tracking approach that addresses the technical challenges related to associating objects to tracklets. For example, the first XR device 304 and the second XR device 308 each generate pose predictions using their respective local sensor data (e.g., the sensors 202). This includes at least some sensor data, such as IMU readings, that external observers cannot access. When the first XR device 304 receives image data containing detected objects, it can then use the object pose predictions received from the second XR device 308 to associate those detected objects with existing tracklets maintained for the second XR device 308, rather than relying on external motion predictions such as Kalman filter predictions.

The first XR device 304 can thus use these received object pose predictions to improve object-to-tracklet association accuracy when detecting and tracking the second XR device 308 within its field of view 312. In some examples, the first XR device 304 can maintain and update a tracklet for the second XR device 308 even without visual detections, e.g., by using only the shared object pose predictions. The same applies to the second XR device 308, which benefits from the object pose predictions it receives from the first XR device 304.

The pose predictions can include SE3 pose data that includes full qualified pose information with both angular and positional components, along with timestamps indicating when the predicted pose is expected to occur. For example, the second XR device 308 generates device pose predictions based on sensor data obtained from its local sensors and transmits these predictions to the first XR device 304 via the wireless communication link.

In some examples, the shared XR experience 300 benefits from iterative prediction refinement where each XR device continuously generates updated pose predictions for the same future timestamp, providing progressively more accurate predictions as network conditions permit. A device may keep predicting the same timestamp into the future for a certain period, and when the receiving device (e.g., the second XR device 308) needs the prediction, it obtains the latest predicted pose for that specific timestamp. Based on the time synchronization 318, both devices can coordinate timestamp-specific predictions effectively.

Figure 4:
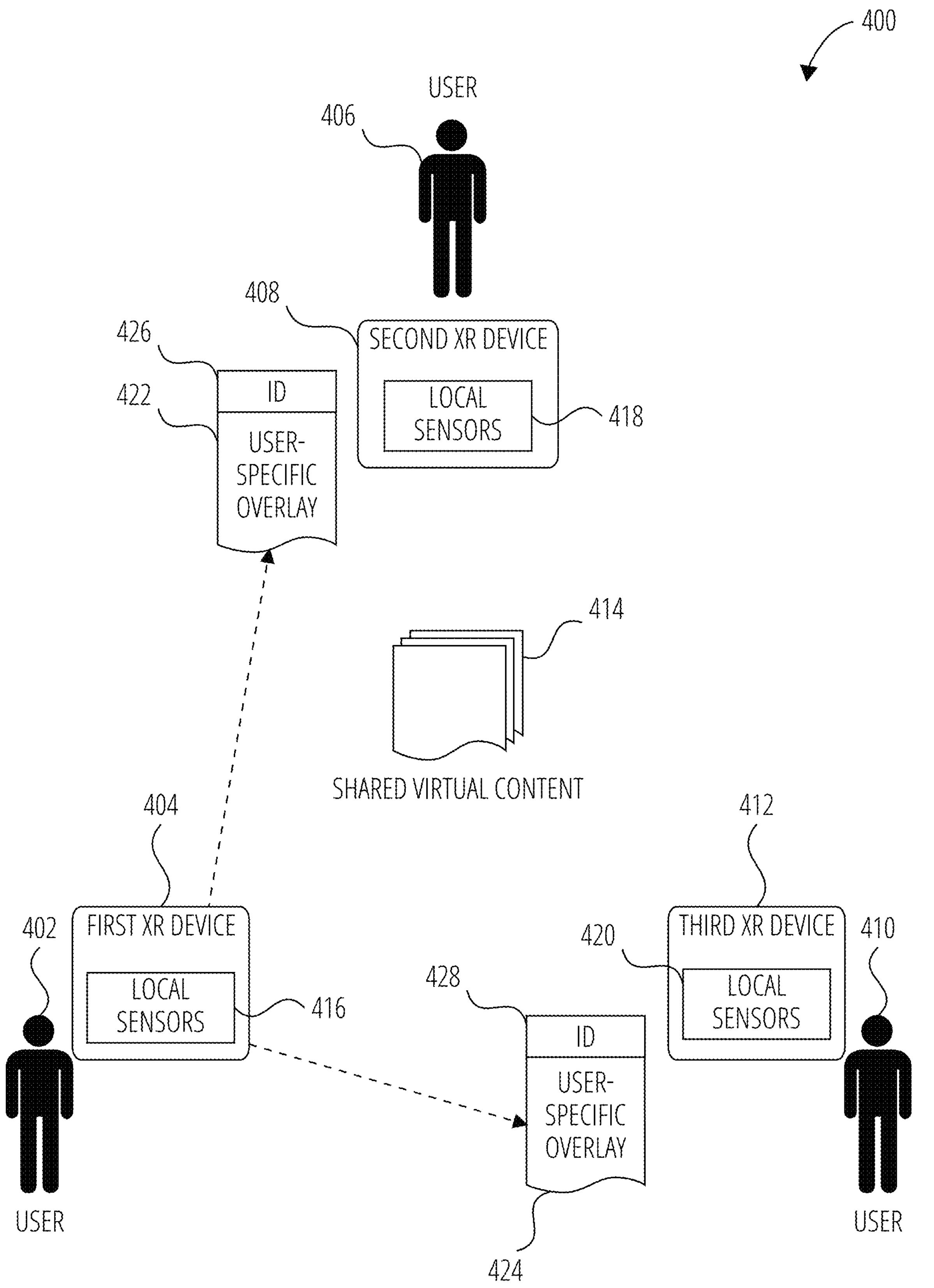
FIG. 4 is a diagram illustrating a shared XR experience involving a first XR device, a second XR device, and a third XR device, and in which collaborative object tracking is performed, according to some examples.

FIG. 4 shows a shared XR experience 400, according to some examples. The shared XR experience 400 is provided between a user 402 of a first XR device 404, a user 406 of a second XR device 408, and a user 410 of a third XR device 412. The first XR device 404, the second XR device 408, and the third XR device 412 are head-mounted AR devices that may include one or more components of the XR device 110 described with reference to FIG. 1 and FIG. 2. Accordingly, reference is made below to certain components shown in FIG. 2.

As shown in FIG. 4, each of the first XR device 404, the second XR device 408, and the third XR device 412 is equipped with local sensors (local sensors 416, local sensors 418, and local sensors 420, respectively). For example, the local sensors include one or more of the sensors 202 of FIG. 2, such as cameras and IMUs. Using these local sensors and the capabilities of the device tracking system 218, each of the first XR device 404, the second XR device 408, and the third XR device 412 predicts its own pose into the future, which is shared with the other XR devices forming part of the shared XR experience 400.

The shared XR experience 400 thus implements bidirectional sharing of pose predictions between the three XR devices, where each XR device generates predictions for itself using its local sensor data and communicates these predictions to the other XR devices for improved object tracking and association operations. In some examples, each of the first XR device 404, the second XR device 408, and the third XR device 412 only predicts its own pose into the future and does not predict or estimate the poses of the other XR devices. Instead, it relies on pose sharing communications from the other XR devices to receive external tracked object pose predictions.

FIG. 4 shows shared virtual content 414, representing a collaborative space where these pose predictions are utilized to help with coordinated virtual content presentation (e.g., through improved object-to-tracklet association accuracy and/or reduced latency). In some examples, each of the first XR device 404, the second XR device 408, and the third XR device 412 maintains tracklets for the other XR devices and uses the received pose predictions to disambiguate between multiple objects in the real-world environment.

As an example, the first XR device 404 demonstrates the practical application of collaborative pose prediction by displaying a user-specific overlay 422 on the user 406 and a user-specific overlay 424 on the user 410 in its field of view, where overlay positioning utilizes the received object pose predictions from the second XR device 408 and the third XR device 412, respectively. The overlays can, for example, include digital effects or other virtual content.

The first XR device 404 maintains a tracklet associated with a first tracking identifier 426 for the second XR device 408 and a further tracklet associated with a second tracking identifier 428 for the third XR device 412. The shared pose predictions the first XR device 404 dynamically receives from the other XR devices helps the first XR device 404 to associate objects in the real world with the correct tracking identifiers, and thus display the user-specific overlay 422 and the user-specific overlay 424 relative to the appropriate users, even where the second XR device 408 and the third XR device 412 move unpredictably, rapidly switch places, or overlap in the field of view of the first XR device 404. This approach may thus help prevent identity switching errors that could cause virtual overlays to jump between users or appear at incorrect locations.

Similarly, the second XR device 408 and the third XR device 412 maintain tracklets for the other XR devices in the shared XR experience 400. In some examples, each tracklet is continuously updated using the most recent object pose predictions received from the corresponding XR device.

Accordingly, in some examples, instead of each XR device performing external predictions for all other devices in the shared XR experience 400 and applying this to perform Kalman filter-based estimations (resulting in $O(n^2)$ complexity, as discussed elsewhere in the present disclosure), each XR device only generates pose predictions for itself and shares the results, reducing computational complexity from $O(n^2)$ to $O(n)$. Furthermore, while FIG. 3 shows two agents and FIG. 4 shows three agents, it is noted that this architecture may scale to larger multi-agent systems with more than three agents, as each additional agent may contribute linear computational overhead rather than exponential increases.

Figure 5:
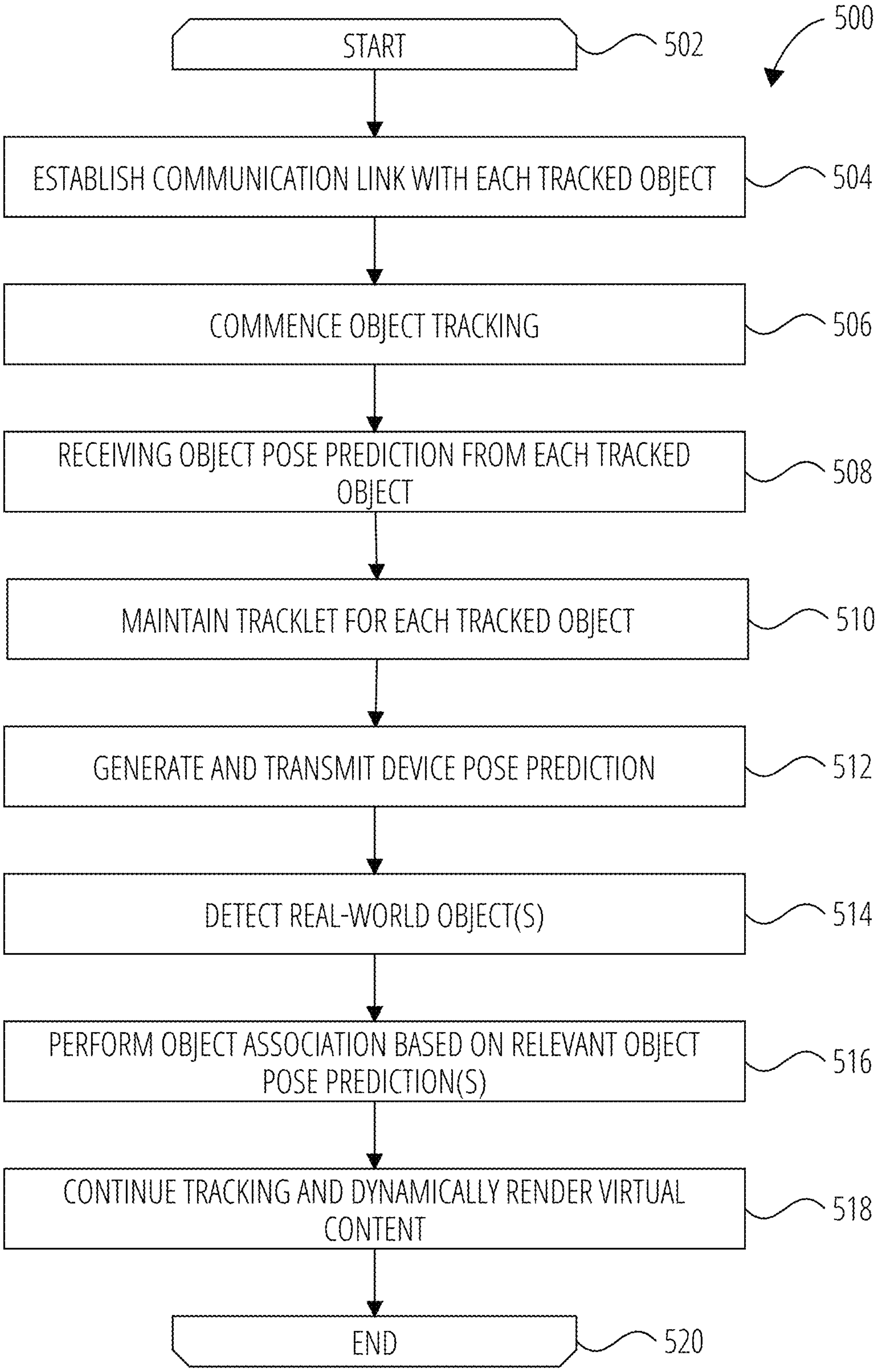
FIG. 5 is a flowchart illustrating a method for collaborative object tracking in an XR environment, according to some examples.

FIG. 5 illustrates a method 500 for collaborative object tracking in an XR environment, according to some examples. Operations in the method 500 may be performed by or using components (e.g., parts, modules, systems, or engines) described above. Accordingly, by way of example and not limitation, the method 500 is described with reference to the first XR device 404, the second XR device 408, and the third XR device 412 of FIG. 4, as well as components illustrated in FIG. 2. However, it shall be appreciated that at least some of the operations of the method 500 may be deployed on various other hardware configurations or be performed by similar components residing elsewhere, and that the method 500 may involve various types of tracked objects.

The method 500 starts at opening operation 502. For example, the first XR device 404 starts or joins a new multi-user session. The session can be controlled by the AR application 222 on each respective XR device.

At operation 504, the communication system 246 of the first XR device 404 establishes communication links with each tracked object in the collaborative tracking environment. The pose sharing component 248 can initiate wireless communication protocols to create bidirectional data exchange channels with other XR devices or other tracked objects. For example, the first XR device 404 establishes communication links with the second XR device 408 and the third XR device 412.

At operation 506, the object tracking system 220 of the first XR device 404 commences object tracking operations using sensor data 238 collected from the sensors 202. In some examples, the device tracking system 218 simultaneously initiates self-tracking operations while the object tracking system 220 begins detecting and identifying objects within the environment.

At operation 508, the pose sharing component 248 receives object pose predictions from each tracked object via the communication system 246. In some examples, the object pose predictions comprise pose data including spatial position and orientation information with timestamps indicating predicted future poses. The received predictions are generated by each tracked object using its local sensor data (e.g., by each of the second XR device 408 and the third XR device 412). The object tracking system 220 of the first XR device 404 can then process these received predictions to generate prediction data 242 for use by the AR application 222.

The first XR device 404 maintains tracklets for each tracked object (operation 510) using the pose information the first XR device 404 receives from the tracked objects. In some examples, each tracklet comprises a sequence of spatial and temporal data points representing the continuous tracking history of an object across multiple time frames.

At operation 512, the device tracking system 218 of the first XR device 404 generates and transmits device pose predictions based on sensor data 238 obtained from the local sensors 416 (e.g., the sensors 202) of the first XR device 404. For example, the first XR device 404 generates its own future pose predictions using internal sensor fusion algorithms that process IMU data, gyroscope measurements, image data, and other motion sensing information.

At operation 514, the object tracking system 220 of the first XR device 404 detects real-world objects colocated with the first XR device 404 in the real-world environment. In some examples, this detection process involves capturing images using image sensors and processing the image data to identify objects within the environment. At operation 516, the object tracking system 220 performs object association based on relevant object pose predictions. In some examples, operation 516 utilizes the prediction data 242 to associate detected objects with existing tracklets. The object tracking system 220 may disambiguate between multiple detected objects using the shared pose predictions and may update tracking identifiers to maintain consistent object identity across frames.

In some examples, once a shared or aligned coordinate system has been established between collaborating agents, the first XR device 404 may reduce reliance on traditional computer vision tracking methods. For example, after initial detection or seeding operations, the shared pose predictions enable the first XR device 404 to determine or accurately estimate the spatial locations of tracked objects within the established coordinate frame, which can then be mapped to corresponding positions within a camera field of view, thereby allowing the object tracking system 220 to maintain accurate tracklets with reduced computational overhead from visual tracking algorithms. Systems and methods described herein may thus allow an XR device to run a visual object tracker less frequently, or even deactivate the visual object tracker for certain periods during multi-agent sessions.

At operation 518, the first XR device 404 continues tracking operations and dynamically renders virtual content through the display arrangement 206. In some examples, the AR application 222 coordinates with the graphical processing unit 226 and display controller 228 to present virtual assets at predetermined locations relative to tracked objects. The rendering process may utilize the shared pose predictions to reduce latency and/or improve accuracy of virtual content placement. The method 500 concludes at closing operation 520.

Figure 6:
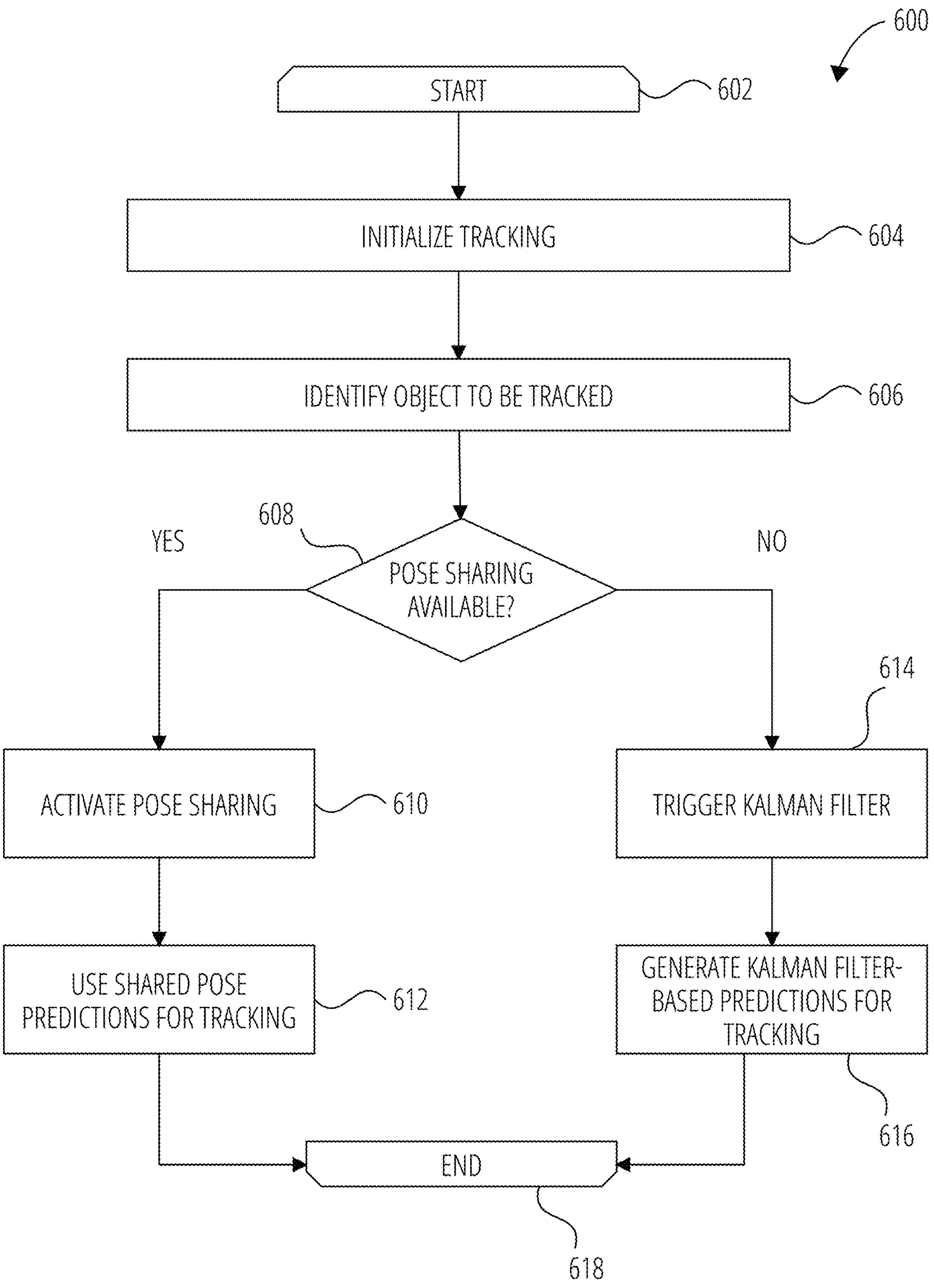
FIG. 6 is a flowchart illustrating method that supports dynamic selection of object tracking techniques, according to some examples.

FIG. 6 illustrates a method 600 that supports selection between different object tracking techniques, according to some examples. Operations in the method 600 may be performed by or using components (e.g., parts, modules, systems, or engines) described above. Accordingly, by way of example and not limitation, the method 600 is described with reference to the first XR device 404, the second XR device 408, and the third XR device 412 of FIG. 4, as well as components illustrated in FIG. 2. However, it shall be appreciated that at least some of the operations of the method 600 may be deployed on various other hardware configurations or be performed by similar components residing elsewhere, and that the method 600 may involve various types of tracked objects.

The method 600 commences at opening operation 602. For example, the first XR device 404 starts or joins a new multi-user session. The session can be controlled by the AR application 222 on each respective XR device.

At operation 604, the object tracking system 220 initializes tracking operations within the first XR device 404. In some examples, this initialization involves configuring the sensors 202, establishing baseline parameters for the tracking algorithms, and preparing data structures for tracklet maintenance. The object tracking system 220 may coordinate with the control system 224 to access settings 244 that define operational parameters for the tracking session.

At operation 606, the object tracking system 220 identifies an object to be tracked within a real-world environment. For example, the object tracking system 220 detects the second XR device 408 in the field of view, or receives tracking information directly from the second XR device 408. The AR application 222 can detect that the second XR device 408 has joined the multi-user or multi-agent session and instruct the first XR device 404 to track the pose of the second XR device 408 to facilitate the shared session.

The method 600 proceeds to decision operation 608, where the first XR device 404 checks whether pose sharing is available for the particular object to be tracked (e.g., the second XR device 408). Decision operation 608 can involve evaluating communication capabilities with the tracked object through the communication system 246, such as assessing network connectivity, device compatibility, and the tracked object's ability or authorization to generate and transmit pose predictions using its own local sensors. The control system 224 may coordinate this evaluation by checking device registration, communication protocols, and pose sharing session availability. For example, the first XR device 404 checks whether the second XR device 408 has enabled a pose prediction sharing feature via the communication link established between the first XR device 404 and the second XR device 408.

If the first XR device 404 determines that pose sharing is available, the method 600 proceeds to operation 610 where the pose sharing component 248 activates pose sharing functionality. The first XR device 404 then receives predicted future poses from the tracked object and also transmits its own predicted future poses to the tracked object, with such data being used for collaborative tracking at operation 612 (e.g., for object association). The first XR device 404 may transmit a one-time request to the second XR device 408 to receive its pose estimations or may transmit a request each time pose data is to be used during the session.

If the first XR device 404 determines at decision operation 608 that pose sharing is not available, the method 600 proceeds to operation 614 where the object tracking system 220 triggers Kalman filter operations for the tracking of the particular object. For example, the first XR device 404 triggers Kalman filter operations to update pose information for the particular tracked object during the session (operation 616). This option may involve utilizing motion models and state estimation techniques to generate predictions for object association purposes. In this context, the first XR device 404 can incorporate appearance and motion information obtained for the tracked object using the sensors 202 of the first XR device 404 into one or more matching cost functions to perform object associations. The method 600 concludes at closing operation 618.

Figure 7:
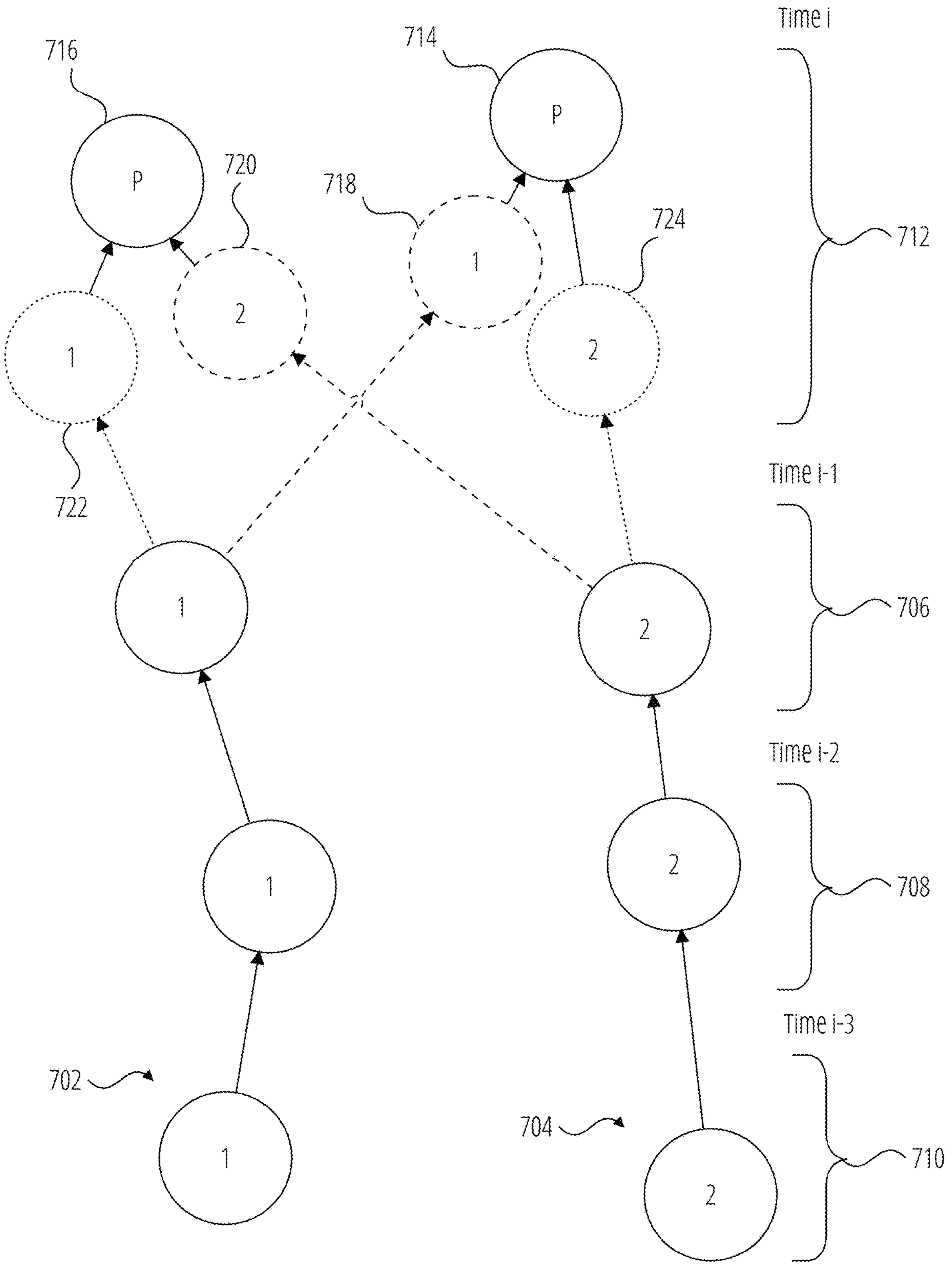
FIG. 7 is a diagrammatic representation of object pose tracking across multiple frames showing pose predictions and associations, according to some examples.

FIG. 7 is a diagrammatic representation of object pose tracking across multiple time frames showing pose predictions and associations, according to some examples. The diagram of FIG. 7 essentially provides a "bird's-eye view" of a first object 702 (labeled "1") and a second object 704 (labeled "2") in a multi-agent system. The first object 702 and the second object 704 may be XR devices or other tracked objects, as described elsewhere in the present disclosure.

The following time points are shown in FIG. 7: three historic time points, including a time point 706 (labeled "i−1"), a time point 708 (labeled "i−2"), and a time point 710 (labeled "i−3"), and a current time point 712 (labeled "i").

A device tracks both the first object 702 and the second object 704. For example, the first XR device 404 tracks both the second XR device 408 and the third XR device 412 as described with reference to FIG. 4.

At the earliest time point (time point 710), the first object 702 and second object 704 are positioned in initial spatial locations and at initial orientations within the relevant environment. As the temporal sequence progresses through time point 708 and time point 706, the poses of the first object 702 and the second object 704 change and the device tracks the first object 702 and the second object 704. The device maintains and updates tracklets for the first object 702 and the second object 704, describing their respective pose trajectories.

As illustrated by the arrows between time point 710 and time point 708 as well as between time point 708 and time point 706 in FIG. 7, the device associates the first object 702 and the second object 704 with the appropriate tracklets from time point 710 to time point 706 and thus maintains the correct object associations.

The current time point 712 illustrates a potential technical problem that can arise when using conventional estimation techniques, such as Kalman-filter based predictions. While the first object 702 and the second object 704 move relatively predictably in the initial stages, the first object 702 and the second object 704 then rapidly move between time point 706 and current time point 712, essentially switching positions. To illustrate this dynamic change, FIG. 7 shows ground truth 718, representing the actual position of the first object 702 at the current time point 712, and ground truth 720, representing the actual position of the second object 704 at the current time point 712.

Traditional Kalman filter predictions, such as a Kalman filter prediction 722 for the first object 702 and a Kalman filter prediction 724 for the second object 704, may (or may be more likely to) incorrectly predict that the first object 702 and second object 704 will travel relatively consistently with their historic trajectories, as depicted by the example predictions shown in FIG. 7. If the device tracking the first object 702 and the second object 704 uses these Kalman filter predictions, it would lead to an identity switching error, with the device incorrectly associating the second object 704 with the tracklet and/or tracking identifier of first object 702, and vice versa.

FIG. 7 shows a current prediction 714 and a current prediction 716 generated using a collaborative pose sharing technique as described herein (e.g., as described with reference to FIGS. 3-5). The current prediction 714 is a predicted future pose for the current time point 712 that was previously shared by the first object 702, and the current prediction 716 is a predicted future pose for the current time point 712 that was previously shared by the second object 704. The current prediction 714 was generated by the first object 702 using its own local sensors and the current prediction 716 was generated by the second object 704 using its own local sensors.

In this collaborative pose sharing approach, instead of the device attempting to predict the future poses of the first object 702 and the second object 704 for the current time point 712, it relies on shared object pose predictions. The device may predict its own pose and share it with the first object 702 and the second object 704.

The collaborative technique can address or alleviate association ambiguity issues by leveraging the superior prediction capabilities of the first object 702 and the second object 704. For example, the device detects that the current prediction 714 is associated with the first object 702 (e.g., based on the relevant object or tracking identifier) and detects that the current prediction 716 is associated with the second object 704, allowing the device to associate the objects it detects in the real-world environment at current time point 712 with the correct tracklets.

In this way, the tracklets for the first object 702 and the second object 704 can be correctly maintained with no switching errors. In other words, the shared pose predictions (labeled "P" in FIG. 7) may improve the likelihood of correct association with the ground truth positions (ground truth 718 and ground truth 720) compared to other techniques. Moreover, and as described elsewhere in the present disclosure, overall computational overhead can be reduced in a multi-agent system since each agent only predicts its own future pose.

Figure 8:
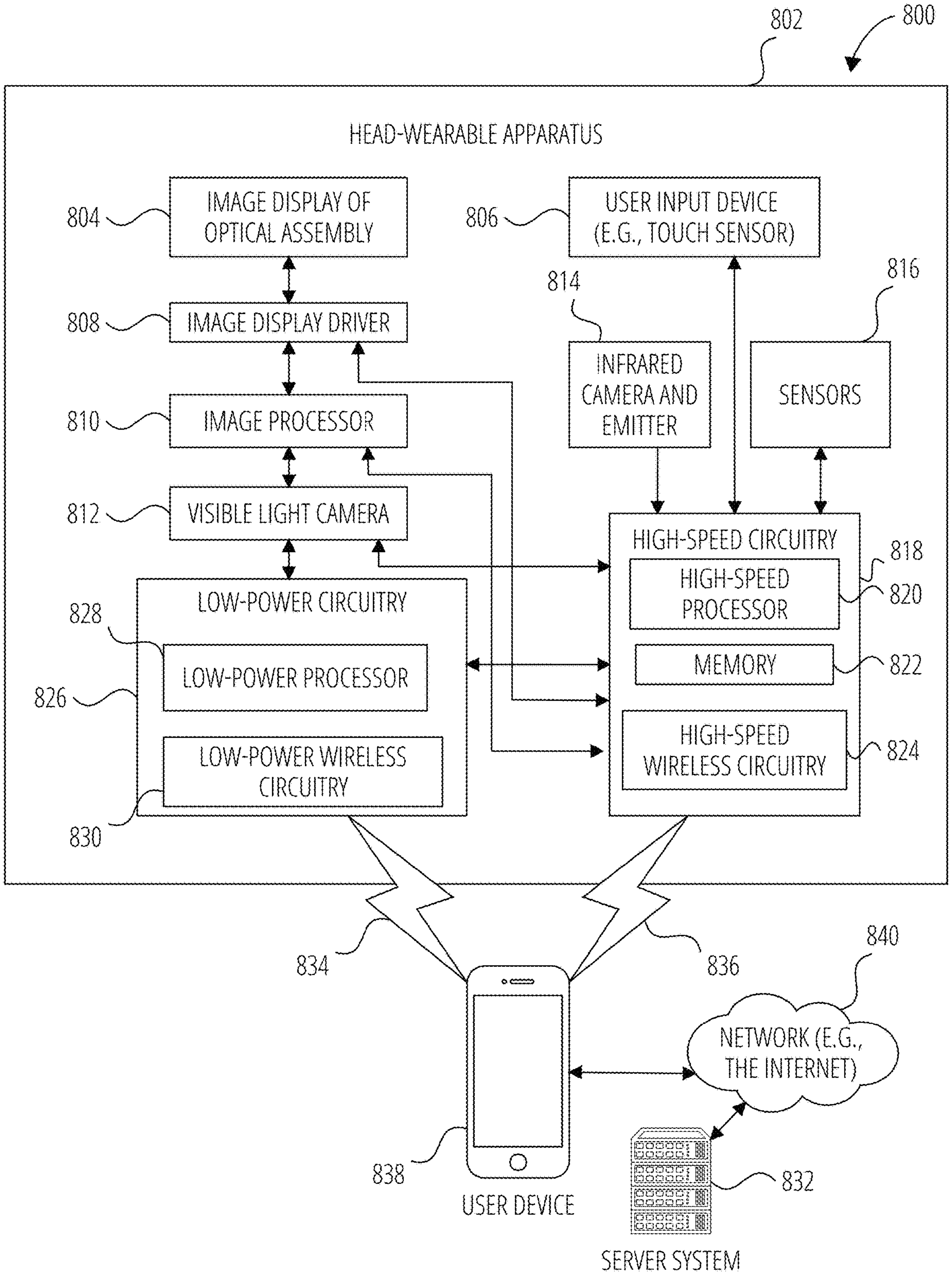
FIG. 8 illustrates a network environment in which a head-wearable apparatus can be implemented, according to some examples.

FIG. 8 illustrates a network environment 800 in which a head-wearable apparatus 802, such as a head-wearable XR device, can be implemented, according to some examples. FIG. 8 provides a high-level functional block diagram of an example head-wearable apparatus 802 communicatively coupled a mobile user device 838 and a server system 832 via a suitable network 840. One or more techniques described herein may be performed using the head-wearable apparatus 802 or a network of devices similar to those shown in FIG. 8.

The head-wearable apparatus 802 includes a camera, such as at least one of a visible light camera 812 and an infrared camera and emitter 814. The head-wearable apparatus 802 includes other sensors 816, such as motion sensors or eye tracking sensors. The user device 838 can be capable of connecting with head-wearable apparatus 802 using both a communication link 834 and a communication link 836. The user device 838 is connected to the server system 832 via the network 840. The network 840 may include any combination of wired and wireless connections.

The head-wearable apparatus 802 has a display arrangement that can have several components. The arrangement can include one or more displays of image display of optical assembly 804. For example, the displays include one associated with the left lateral side and one associated with the right lateral side of the head-wearable apparatus 802. The head-wearable apparatus 802 also includes an image display driver 808, an image processor 810, low-power circuitry 826, and high-speed circuitry 818. The two displays of the image display of optical assembly 804 are for presenting images and videos, including an image that can provide a graphical user interface to a user of the head-wearable apparatus 802.

The image display driver 808 commands and controls the image display of the image display of optical assembly 804. The image display driver 808 may deliver image data directly to each image display of the image display of optical assembly 804 for presentation or may have to convert the image data into a signal or data format suitable for delivery to each image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

The head-wearable apparatus 802 may include a frame and stems (or temples) extending from a lateral side of the frame, or another component to facilitate wearing of the head-wearable apparatus 802 by a user. The head-wearable apparatus 802 of FIG. 8 further includes a user input device 806 (e.g., touch sensor or push button) including an input surface on the head-wearable apparatus 802. The user input device 806 is configured to receive, from the user, an input selection to manipulate the graphical user interface of the presented image.

The components shown in FIG. 8 for the head-wearable apparatus 802 are located on one or more circuit boards, for example a printed circuit board (PCB) or flexible PCB, in the rims or temples. Alternatively, or additionally, the depicted components can be located in the chunks, frames, hinges, or bridges of the head-wearable apparatus 802. Left and right sides of the head-wearable apparatus 802 can each include a digital camera element such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 802 includes a memory 822 which stores instructions to perform a subset of, or all, of the functions of the head-wearable apparatus 802. The memory 822 can also include a storage device. As further shown in FIG. 8, the high-speed circuitry 818 includes a high-speed processor 820, the memory 822, and high-speed wireless circuitry 824. In FIG. 8, the image display driver 808 is coupled to the high-speed circuitry 818 and operated by the high-speed processor 820 to drive the left and right image displays of the image display of optical assembly 804. The high-speed processor 820 may be any processor capable of managing high-speed communications and operation of any general computing system needed for the head-wearable apparatus 802. The high-speed processor 820 includes processing resources needed for managing high-speed data transfers over the communication link 836 to a wireless local area network (WLAN) using high-speed wireless circuitry 824. In certain examples, the high-speed processor 820 executes an operating system such as a LINUX operating system or other such operating system of the head-wearable apparatus 802 and the operating system is stored in memory 822 for execution. In addition to any other responsibilities, the high-speed processor 820 executing a software architecture for the head-wearable apparatus 802 is used to manage data transfers with high-speed wireless circuitry 824. In certain examples, high-speed wireless circuitry 824 is configured to implement Institute of Electrical and Electronic Engineers (IEEE) 802.11 communication standards, also referred to herein as Wi-Fi. In other examples, other high-speed communications standards may be implemented by high-speed wireless circuitry 824.

The low-power wireless circuitry 830 and the high-speed wireless circuitry 824 of the head-wearable apparatus 802 can include short range transceivers (Bluetooth™, Bluetooth Low Energy (LE), Zigbee, or ANT+) and wireless wide, local, or wide area network transceivers (e.g., cellular or Wi-Fi). The user device 838, including the transceivers communicating via the communication link 834 and communication link 836, may be implemented using details of the architecture of the head-wearable apparatus 802, as can other elements of the network 840.

The memory 822 includes any storage device capable of storing various data and applications, including, among other things, camera data generated by the visible light camera 812, sensors 816, and/or the image processor 810, as well as images generated for display by the image display driver 808 on the image displays of the image display of optical assembly 804. While the memory 822 is shown as integrated with the high-speed circuitry 818, in other examples, the memory 822 may be an independent standalone element of the head-wearable apparatus 802. In certain such examples, electrical routing lines may provide a connection through a chip that includes the high-speed processor 820 from the image processor 810 or low-power processor 828 to the memory 822. In other examples, the high-speed processor 820 may manage addressing of memory 822 such that the low-power processor 828 will boot the high-speed processor 820 any time that a read or write operation involving memory 822 is needed.

As shown in FIG. 8, the low-power processor 828 or high-speed processor 820 of the head-wearable apparatus 802 can be coupled to the camera (visible light camera 812, or infrared camera and emitter 814), the image display driver 808, the user input device 806 (e.g., touch sensor or push button), and the memory 822. The head-wearable apparatus 802 also includes sensors 816, which may be the motion components, position components, environmental components, and/or biometric components. In particular, motion components and position components are used by the head-wearable apparatus 802 to determine and keep track of the position and orientation (the "pose") of the head-wearable apparatus 802 relative to a frame of reference or another object, in conjunction with a video feed from one of the visible light cameras 812, using, for example, techniques such as structure from motion (SfM) or Visual Inertial Odometry (VIO).

In some examples, and as shown in FIG. 8, the head-wearable apparatus 802 is connected with a host computer. For example, the head-wearable apparatus 802 is paired with the user device 838 via the communication link 836 or connected to the server system 832 via the network 840. The server system 832 may be one or more computing devices as part of a service or network computing system, for example, that include a processor, a memory, and network communication interface to communicate over the network 840 with the user device 838 and head-wearable apparatus 802.

The user device 838 includes a processor and a network communication interface coupled to the processor. The network communication interface allows for communication over the network 840, communication link 834 or communication link 836. The user device 838 can further store at least portions of the instructions to implement the functionality described herein.

Output components of the head-wearable apparatus 802 include visual components, such as a display (e.g., one or more liquid-crystal display (LCD)), one or more plasma display panel (PDP), one or more light emitting diode (LED) display, one or more projector, or one or more waveguide. In some examples, the image displays of the optical assembly are driven by the image display driver 808. The output components of the head-wearable apparatus 802 further include acoustic components (e.g., speakers), haptic components (e.g., a vibratory motor), other signal generators, and so forth. The input components of the head-wearable apparatus 802, the user device 838, and server system 832, such as the user input device 806, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 802 may optionally include additional peripheral device elements. Such peripheral device elements may include sensors or display elements integrated with the head-wearable apparatus 802. For example, peripheral device elements may include any I/O components including output components, motion components, position components, or any other such elements described herein.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over a communication link 836 from the user device 838 via the low-power wireless circuitry 830 or high-speed wireless circuitry 824.

Figure 9:
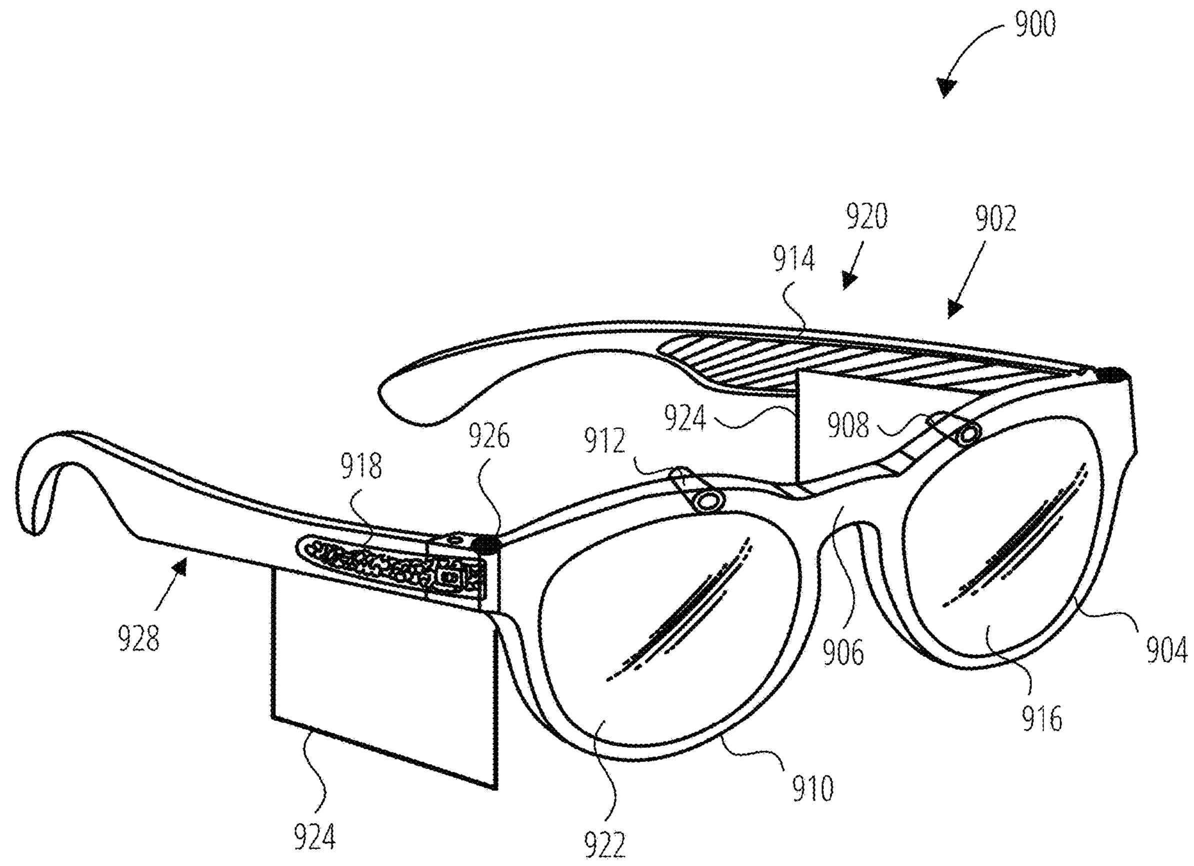
FIG. 9 is a perspective view of a head-worn device, according to some examples.

FIG. 9 is a perspective view of a head-worn AR device in the form of glasses 900, in accordance with some examples. The glasses 900 can include a frame 902 made from any suitable material such as plastic or metal, including any suitable shape memory alloy. In one or more examples, the frame 902 includes a first or left optical element holder 904 (e.g., a display or lens holder) and a second or right optical element holder 910 connected by a bridge 906. A first or left optical element 916 and a second or right optical element 922 can be provided within respective left optical element holder 904 and right optical element holder 910. The right optical element 922 and the left optical element 916 can be a lens, a display, a display assembly, or a combination of the foregoing. Any suitable display assembly can be provided in the glasses 900.

The frame 902 additionally includes a left arm or temple piece 920 and a right arm or temple piece 928. In some examples, the frame 902 can be formed from a single piece of material so as to have a unitary or integral construction.

The glasses 900 can include a computing device, such as a computer 918, which can be of any suitable type so as to be carried by the frame 902 and, in some examples, of a suitable size and shape, so as to be partially disposed in one of the temple piece 920 or the temple piece 928. The computer 918 can include one or more processors with memory, wireless communication circuitry, and a power source. As discussed with reference to FIG. 8 above, the computer 918 may comprise low-power circuitry, high-speed circuitry, and a display processor. Various other examples may include these elements in different configurations or integrated together in different ways. Additional details of aspects of the computer 918 may be implemented as illustrated by the head-wearable apparatus 802 discussed above.

The computer 918 additionally includes a battery 914 or other suitable portable power supply. In some examples, the battery 914 is disposed in left temple piece 920 and is electrically coupled to the computer 918 disposed in the right temple piece 928. The glasses 900 can include a connector or port (not shown) suitable for charging the battery 914 a wireless receiver, transmitter or transceiver (not shown), or a combination of such devices.

The glasses 900 include a first or left camera 908 and a second or right camera 912. Although two cameras are depicted, other examples contemplate the use of a single or additional (i.e., more than two) cameras. In some examples, the glasses 900 include any number of input sensors or other input/output devices in addition to the left camera 908 and the right camera 912. Such sensors or input/output devices can additionally include biometric sensors, location sensors, motion sensors, and so forth. In some examples, the left camera 908 and the right camera 912 provide video frame data for use by the glasses 900 to extract 3D information from a real-world scene, to track objects, to determine relative positions between objects, etc.

The glasses 900 may also include a touchpad 924 mounted to or integrated with one or both of the left temple piece 920 and right temple piece 928. The touchpad 924 is generally vertically-arranged, approximately parallel to a user's temple in some examples. As used herein, generally vertically aligned means that the touchpad is more vertical than horizontal, although potentially more vertical than that. Additional user input may be provided by one or more buttons 926, which in the illustrated examples are provided on the outer upper edges of the left optical element holder 904 and right optical element holder 910. The one or more touchpads 924 and buttons 926 provide a means whereby the glasses 900 can receive input from a user of the glasses 900.

Figure 10:
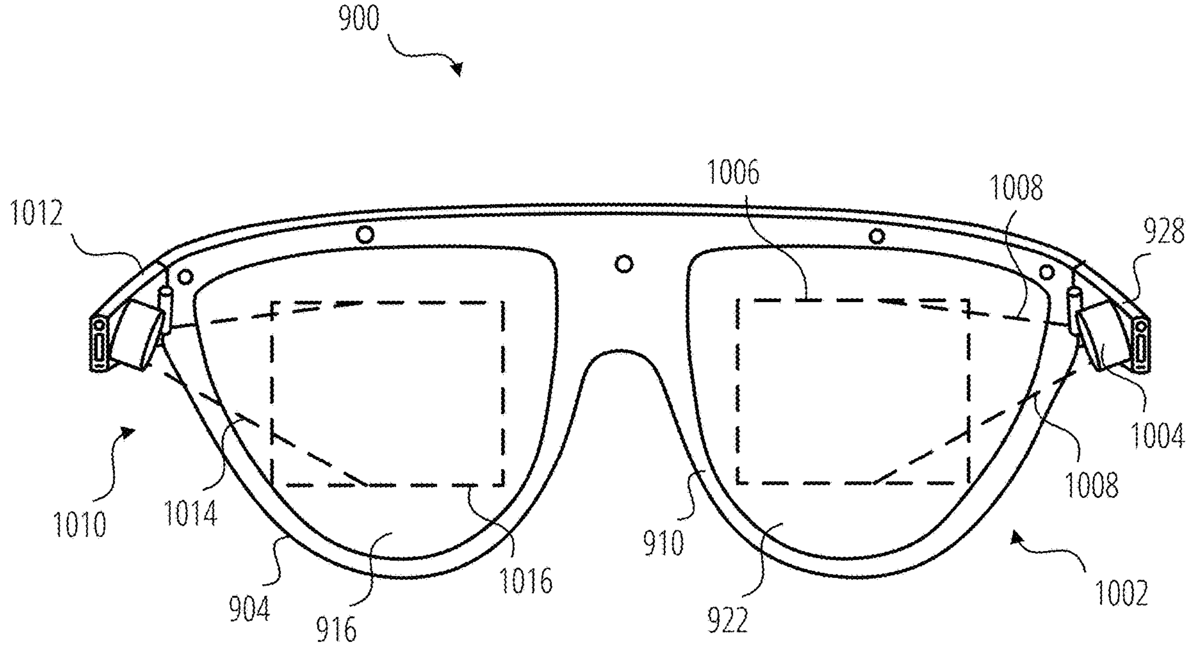
FIG. 10 illustrates a further view of the head-worn device of FIG. 9, showing the device from the perspective of a user, according to some examples.

FIG. 10 illustrates the glasses 900 from the perspective of a user. For clarity, a number of the elements shown in FIG. 9 have been omitted. As described in FIG. 9, the glasses 900 shown in FIG. 10 include left optical element 916 and right optical element 922 secured within the left optical element holder 904 and the right optical element holder 910 respectively.

The glasses 900 include forward optical assembly 1002 comprising a right projector 1004 and a right near eye display 1006, and a forward optical assembly 1010 including a left projector 1012 and a left near eye display 1016.

In some examples, the near eye displays are waveguides. The waveguides include reflective or diffractive structures (e.g., gratings and/or optical elements such as mirrors, lenses, or prisms). Light 1008 emitted by the projector 1004 encounters the diffractive structures of the waveguide of the near eye display 1006, which directs the light towards the right eye of a user to provide an image on or in the right optical element 922 that overlays the view of the real world seen by the user. Similarly, light 1014 emitted by the projector 1012 encounters the diffractive structures of the waveguide of the near eye display 1016, which directs the light towards the left eye of a user to provide an image on or in the left optical element 916 that overlays the view of the real world seen by the user. The combination of a GPU, the forward optical assembly 1002, the forward optical assembly 1010, the left optical element 916, and the right optical element 922 may provide an optical engine of the glasses 900. The glasses 900 use the optical engine to generate an overlay of the real-world view of the user including display of a 3D user interface to the user of the glasses 900.

It will be appreciated however that other display technologies or configurations may be utilized within an optical engine to display an image to a user in the user's field of view. For example, instead of a projector 1004 and a waveguide, an LCD, LED or other display panel or surface may be provided.

In use, a user of the glasses 900 will be presented with information, content and various 3D user interfaces on the near eye displays. As described in more detail elsewhere herein, the user can then interact with a device such as the glasses 900 using a touchpad 924 and/or the buttons 926, voice inputs or touch inputs on an associated device (e.g., the user device 838 shown in FIG. 8), and/or hand movements, locations, and positions detected by the glasses 900.

Figure 11:
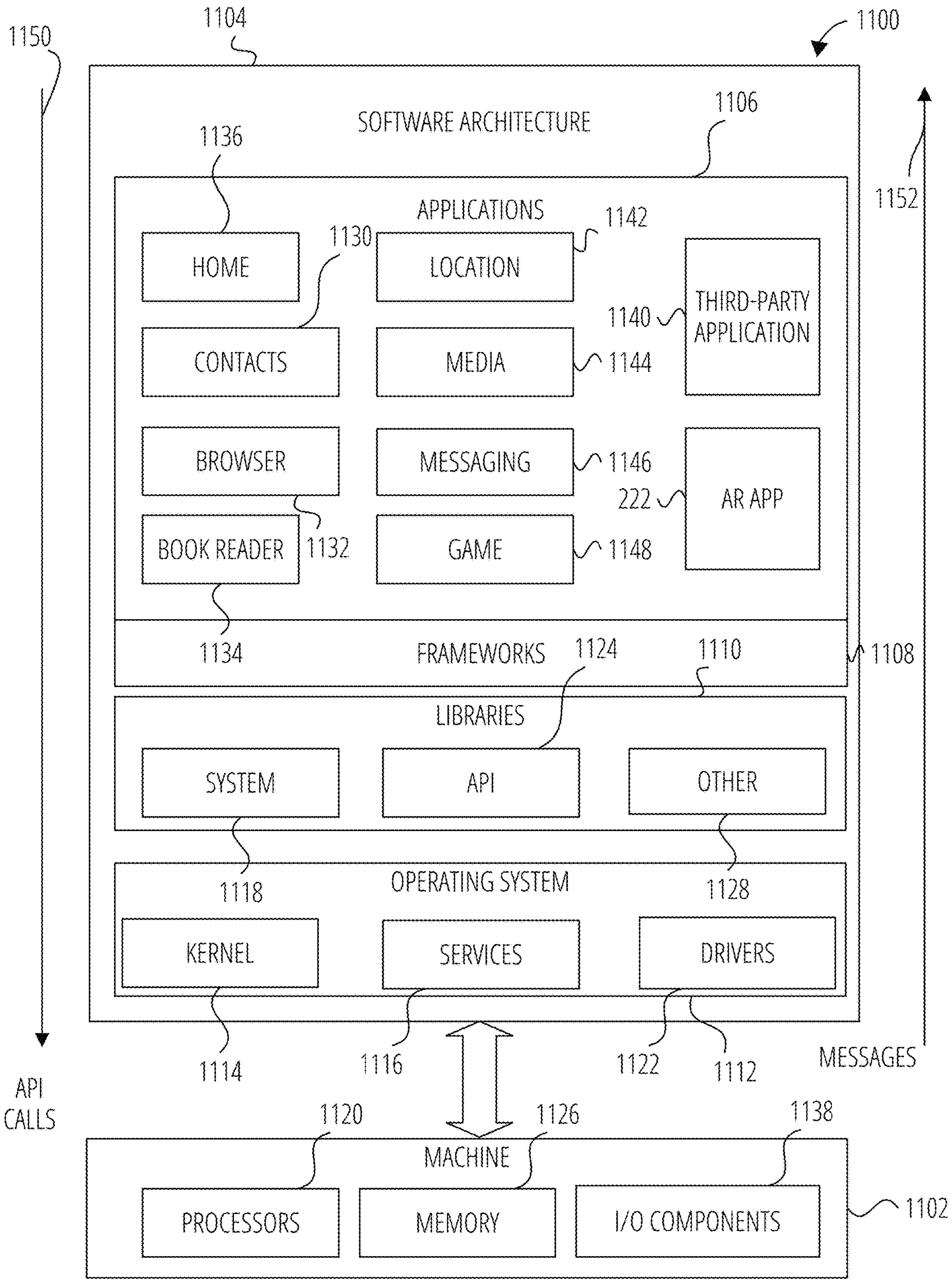
FIG. 11 is a block diagram showing a software architecture within which the present disclosure may be implemented, according to some examples.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture

1104 includes layers such as an operating system 1112, libraries 1110, frameworks 1108, and applications 1106. Operationally, the applications 1106 invoke Application Programming Interface calls, API calls 1150, through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, Bluetooth™ or Bluetooth™ Low Energy drivers, flash memory drivers, serial communication drivers (e.g., Universal Serial Bus (USB) drivers), WI-FI™ drivers, audio drivers, power management drivers, and so forth.

The libraries 1110 provide a low-level common infrastructure used by the applications 1106. The libraries 1110 can include system libraries 1118 (e.g., C standard library) that provide functions such as memory allocation functions, string manipulation functions, mathematical functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and 3D in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a high-level common infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In some examples, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In some examples, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In FIG. 11, the third-party application 1140 can invoke the API calls 1150 provided by the operating system 1112 to facilitate functionality described herein. The applications 1106 may include an AR application such as the AR application 222 described herein, according to some examples.

Figure 12:
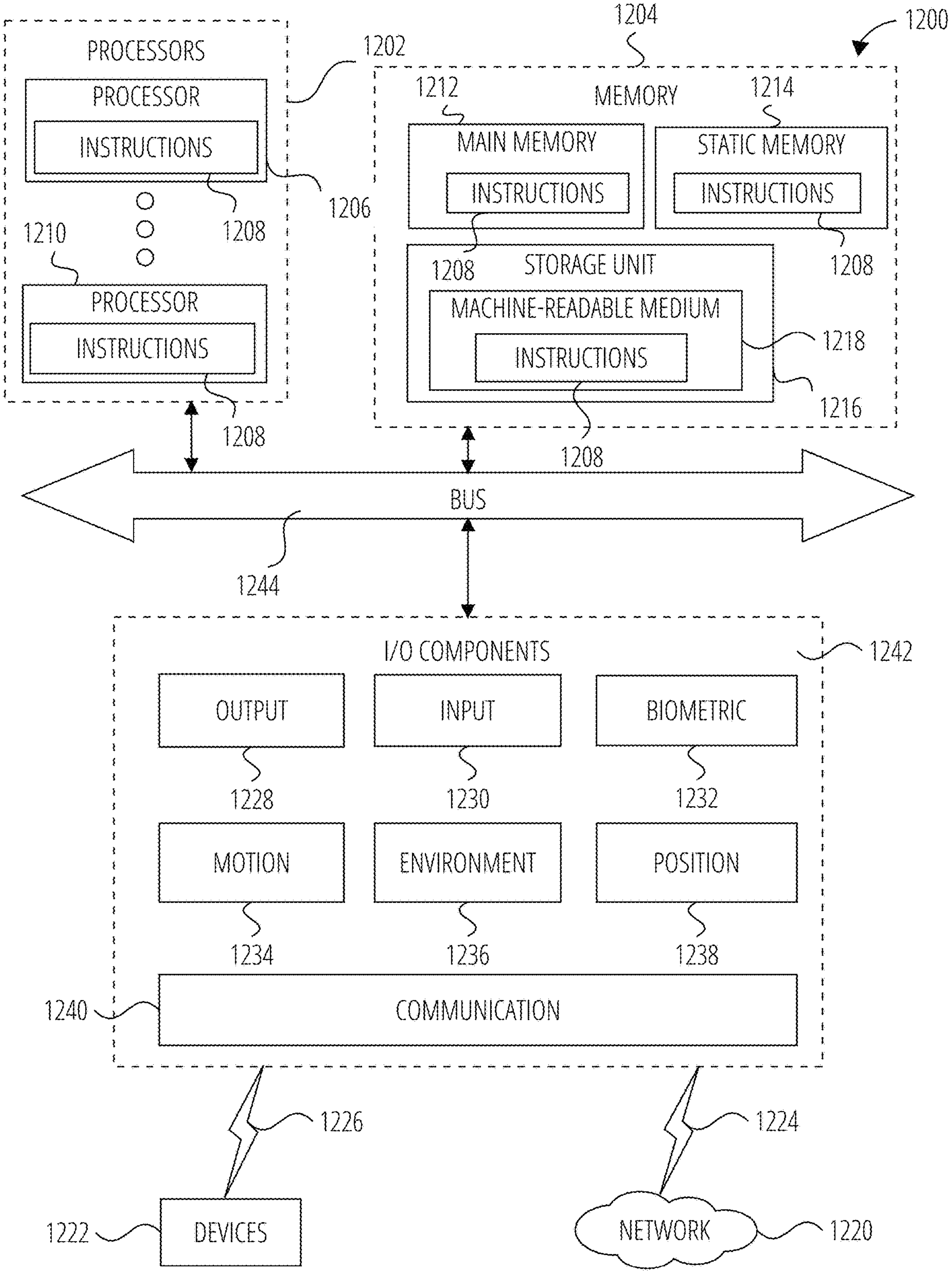
FIG. 12 is a diagrammatic representation of a machine in the form of a computer system within which a set of instructions may be executed for causing the machine to perform any one or more of the methodologies discussed herein, according to some examples.

FIG. 12 is a diagrammatic representation of a machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), XR device, VR device, a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein.

The machine 1200 may include processors 1202, memory 1204, and I/O components 1242, which may be configured to communicate with each other via a bus 1244. In some examples, the processors 1202 may include, for example, a processor 1206 and a processor 1210 that execute the instructions 1208. Although FIG. 12 shows multiple processors 1202, the machine 1200 may include a single processor with a single core, a single processor with multiple cores (e.g., a multi-core processor), multiple processors with a single core, multiple processors with multiples cores, or any combination thereof.

The memory 1204 includes a main memory 1212, a static memory 1214, and a storage unit 1216, accessible to the processors via the bus 1244. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the processors, or any suitable combination thereof, during execution thereof by the machine 1200.

The I/O components 1242 may include a wide variety of components to receive input, provide output, produce output, transmit information, exchange information, capture measurements, and so on. The specific I/O components 1242 that are included in a particular machine will depend on the type of machine. For example, portable machines such as mobile phones may include a touch input device or other such input mechanisms, while a headless server machine will likely not include such a touch input device. It will be appreciated that the I/O components 1242 may include many other components that are not shown in FIG. 12. In various examples, the I/O components 1242 may include output components 1228 and input components 1230. The output components 1228 may include visual components (e.g., a display such as a plasma display panel (PDP), a light emitting diode (LED) display, a LCD, a projector, or a cathode ray tube (CRT)), acoustic components (e.g., speakers), haptic components (e.g., a vibratory motor, resistance mechanisms), other signal generators, and so forth. The input components 1230 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 1242 may include biometric components 1232, motion components 1234, environmental components 1236, or position components 1238, among a wide array of other components. For example, the biometric components 1232 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 include acceleration sensor components (e.g., accelerometer), gravitation sensor components, rotation sensor components (e.g., gyroscope), and so forth. The environmental components 1236 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 include location sensor components (e.g., a GPS receiver components), altitude sensor components (e.g., altimeters or barometers that detect air pressure from which altitude may be derived), orientation sensor components (e.g., magnetometers), and the like.

Any biometric data collected by biometric components is captured and stored with only user approval and deleted on user request. Further, such biometric data is used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Communication may be implemented using a wide variety of technologies. The I/O components 1242 further include communication components 1240 operable to couple the machine 1200 to a network 1220 or devices 1222 via a coupling 1224 and a coupling 1226, respectively. For example, the communication components 1240 may include a network interface component or another suitable device to interface with the network 1220. In further examples, the communication components 1240 may include wired communication components, wireless communication components, cellular communication components, Near Field Communication (NFC) components, Bluetooth™ components, Wi-Fi™ components, and other communication components to provide communication via other modalities. The devices 1222 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an image sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geolocation, location via Wi-Fi™ signal triangulation, location via detecting an NFC beacon signal that may indicate a particular location, and so forth.

The various memories (e.g., memory 1204, main memory 1212, static memory 1214, and/or memory of the processors 1202) and/or storage unit 1216 may store one or more sets of instructions and data structures (e.g., software) embodying or used by any one or more of the methodologies or functions described herein. These instructions (e.g., the instructions 1208), when executed by processors 1202, cause various operations to implement the disclosed examples.

The instructions 1208 may be transmitted or received over the network 1220, using a transmission medium, via a network interface device (e.g., a network interface component included in the communication components 1240) and using any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The above description describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Although aspects have been described with reference to specific examples, it will be evident that various modifications and changes may be made to these examples without departing from the broader scope of the present disclosure. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

As used herein, the term "processor" may refer to any one or more circuits or virtual circuits (e.g., a physical circuit emulated by logic executing on an actual processor) that manipulates data values according to control signals (e.g., commands, opcodes, machine code, control words, macro-instructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), an FPGA, a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, Very Long Instruction Word (VLIW), vector processing, or Single Instruction, Multiple Data (SIMD) that allow each core to run separate instruction streams concurrently. A processor may be emulated in software, running on a physical processor, as a virtual processor or virtual circuit. The virtual processor may behave like an independent processor but is implemented in software rather than hardware.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

EXAMPLES

In view of the above-described implementations of subject matter this application discloses the following list of examples, wherein one feature of an example in isolation, or more than one feature of an example taken in combination, and, optionally, in combination with one or more features of one or more further examples, are further examples also falling within the disclosure of this application.

Example 1 is an XR device comprising: at least one processor; and memory storing instructions that, when executed by the at least one processor, cause the XR device to perform operations comprising: maintaining a tracklet for a tracked object; receiving an object pose prediction comprising a predicted future pose of the tracked object, the object pose prediction generated by the tracked object based on sensor data obtained using one or more local sensors of the tracked object; updating the tracklet based on the object pose prediction; and associating a real-world object in a field of view of the XR device with the tracked object based on the updated tracklet.

In Example 2, the subject matter of Example 1 includes, wherein the associating of the real-world object with the tracked object comprises using the object pose prediction to disambiguate between multiple detected real-world objects, each of the multiple detected real-world objects being associated with a tracking identifier.

In Example 3, the subject matter of any of Examples 1-2 includes, wherein the XR device is a first XR device, the tracked object is a second XR device, the tracklet comprises a first tracklet, and the sensor data comprises second sensor data, the operations further comprising: generating, based on first sensor data obtained using one or more local sensors of the first XR device, a device pose prediction comprising a predicted future pose of the first XR device; and transmitting the device pose prediction to the second XR device, wherein the second XR device uses the device pose prediction to maintain a second tracklet for the first XR device.

In Example 4, the subject matter of any of Example 3 includes, wherein the object pose prediction comprises a first object pose prediction and the real-world object comprises a first real-world object, the operations further comprising: maintaining a third tracklet for a third XR device colocated with the first XR device and the second XR device (e.g., the first XR device, the second XR device, and the third XR device all participate in a pose sharing session); transmitting the device pose prediction to the third XR device; receiving a second object pose prediction comprising a predicted future pose of the third XR device, the second object pose prediction generated by the third XR device based on third sensor data obtained using one or more local sensors of the third XR device; updating the third tracklet based on the second object pose prediction; and associating a second real-world object in the field of view of the XR device with the third XR device based on the updated third tracklet.

In Example 5, the subject matter of any of Examples 3-4 includes, the operations further comprising: establishing a shared coordinate system between the first XR device and the second XR device.

In Example 6, the subject matter of Example 5 includes, the operations further comprising: using the shared coordinate system to align virtual content that is simultaneously presented by the first XR device and the second XR device.

In Example 7, the subject matter of any of Examples 1-6 includes, wherein the predicted future pose comprises a six-degree-of-freedom pose representation.

In Example 8, the subject matter of any of Examples 1-7 includes, wherein the predicted future pose is generated by the tracked object at a first time point for a future timestamp, the operations further comprising: updating the tracklet for a second time point using the predicted future pose, the second time point following the first time point and corresponding to the future timestamp.

In Example 9, the subject matter of any of Examples 1-8 includes, wherein the tracked object generates, at different time points, multiple predicted future poses for a same future timestamp, and the XR device receives and applies at least one of the multiple predicted future poses to update the tracklet.

In Example 10, the subject matter of any of Examples 1-9 includes, wherein the predicted future pose comprises a first predicted future pose generated by the tracked object at a first time point for a future timestamp, the operations further comprising: receiving a second predicted future pose, the second predicted future pose generated by the tracked object at a second time point subsequent to the first time point for the future timestamp; and using the second predicted future pose to modify the tracklet.

In Example 11, the subject matter of any of Examples 1-10 includes, the operations further comprising: processing the object pose prediction to generate values representing a location relative to the tracked object; and rendering, via a display of the XR device, virtual content to be perceived by a user of the XR device at the location relative to the tracked object.

In Example 12, the subject matter of any of Examples 1-11 includes, wherein the one or more local sensors of the tracked object comprise at least one of an image sensor of the tracked object (e.g., camera) a motion sensor of the tracked object (e.g., IMU).

In Example 13, the subject matter of any of Examples 1-12 includes, the operations further comprising: establishing a wireless communication link between the XR device and the tracked object, wherein the object pose prediction is transmitted to the XR device directly from the tracked object via the wireless communication link.

In Example 14, the subject matter of Example 13 includes, wherein the establishing of the wireless communication link comprises establishing a pose sharing session in which pose data is shared bidirectionally between the XR device and the tracked object via the wireless communication link.

In Example 15, the subject matter of any of Examples 1-14 includes, the operations further comprising: capturing one or more images of a real-world environment; and processing the one or more images to detect the real-world object.

In Example 16, the subject matter of Example 15 includes, the operations further comprising: generating a bounding box relative to the real-world object; and using the predicted future pose to localize the real-world object within the bounding box.

Example 17 is a method performed by an XR device, the method comprising: maintaining a tracklet for a tracked object; receiving an object pose prediction comprising a predicted future pose of the tracked object, the object pose prediction generated by the tracked object based on sensor data obtained using one or more local sensors of the tracked object; updating the tracklet based on the object pose prediction; and associating a real-world object in a field of view of the XR device with the tracked object based on the updated tracklet.

In Example 18, the subject matter of Example 17 includes, wherein the associating of the real-world object with the tracked object comprises using the object pose prediction to disambiguate between multiple detected real-world objects, each of the multiple detected real-world objects being associated with a tracking identifier.

In Example 19, the subject matter of Examples 17-18 includes, wherein the XR device is a first XR device, the tracked object is a second XR device, the tracklet comprises a first tracklet, and the sensor data comprises second sensor data, the method further comprising: generating, based on first sensor data obtained using one or more local sensors of the first XR device, a device pose prediction comprising a predicted future pose of the first XR device; and transmitting the device pose prediction to the second XR device, wherein the second XR device uses the device pose prediction to maintain a second tracklet for the first XR device.

Example 20 is at least one non-transitory computer-readable storage medium, the at least one non-transitory computer-readable storage medium including instructions that when executed by at least one processor of an XR device, cause the at least one processor to perform operations comprising: maintaining a tracklet for a tracked object; receiving an object pose prediction comprising a predicted future pose of the tracked object, the object pose prediction generated by the tracked object based on sensor data obtained using one or more local sensors of the tracked object; updating the tracklet based on the object pose prediction; and associating a real-world object in a field of view of the XR device with the tracked object based on the updated tracklet.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

What is claimed is:

1. An eXtended reality (XR) device comprising:
- at least one processor; and
- memory storing instructions that, when executed by the at least one processor, cause the XR device to perform operations comprising:
  - maintaining a tracklet for a tracked object;
  - receiving an object pose prediction comprising a predicted future pose of the tracked object, the object pose prediction generated by the tracked object based on sensor data obtained using one or more local sensors of the tracked object;
  - updating the tracklet based on the object pose prediction; and
  - associating a real-world object in a field of view of the XR device with the tracked object based on the updated tracklet.

2. The XR device of claim 1, wherein the associating of the real-world object with the tracked object comprises using the object pose prediction to disambiguate between multiple detected real-world objects, each of the multiple detected real-world objects being associated with a tracking identifier.

3. The XR device of claim 1, wherein the XR device is a first XR device, the tracked object is a second XR device, the first XR device and the second XR device participate in a pose sharing session, the tracklet comprises a first tracklet, and the sensor data comprises second sensor data, the operations further comprising:
- generating, based on first sensor data obtained using one or more local sensors of the first XR device, a device pose prediction comprising a predicted future pose of the first XR device; and
- transmitting the device pose prediction to the second XR device, wherein the second XR device uses the device pose prediction to maintain a second tracklet for the first XR device.

4. The XR device of claim 3, wherein a third XR device colocated with the first XR device and the second XR device further participates in the pose sharing session, wherein the object pose prediction comprises a first object pose prediction and the real-world object comprises a first real-world object, the operations further comprising:
- maintaining a third tracklet for the third XR device;
- transmitting the device pose prediction to the third XR device;
- receiving a second object pose prediction comprising a predicted future pose of the third XR device, the second object pose prediction generated by the third XR device based on third sensor data obtained using one or more local sensors of the third XR device;
- updating the third tracklet based on the second object pose prediction; and
- associating a second real-world object in the field of view of the XR device with the third XR device based on the updated third tracklet.

5. The XR device of claim 3, the operations further comprising:
- establishing a shared coordinate system between the first XR device and the second XR device.

6. The XR device of claim 5, the operations further comprising:
- using the shared coordinate system to align virtual content that is simultaneously presented by the first XR device and the second XR device.

7. The XR device of claim 1, wherein the predicted future pose comprises a six-degree-of-freedom pose representation.

8. The XR device of claim 1, wherein the predicted future pose is generated by the tracked object at a first time point for a future timestamp, the operations further comprising:
- updating the tracklet for a second time point using the predicted future pose, the second time point following the first time point and corresponding to the future timestamp.

9. The XR device of claim 1, wherein the tracked object generates, at different time points, multiple predicted future poses for a same future timestamp, and the XR device receives and applies at least one of the multiple predicted future poses to update the tracklet.

10. The XR device of claim 1, wherein the predicted future pose comprises a first predicted future pose generated by the tracked object at a first time point for a future timestamp, the operations further comprising:
- receiving a second predicted future pose, the second predicted future pose generated by the tracked object at a second time point subsequent to the first time point for the future timestamp; and using the second predicted future pose to modify the tracklet.

11. The XR device of claim 1, the operations further comprising:

processing the object pose prediction to generate values representing a location relative to the tracked object; and rendering, via a display of the XR device, virtual content to be perceived by a user of the XR device at the location relative to the tracked object.

12. The XR device of claim 1, wherein the one or more local sensors of the tracked object comprise at least one of an image sensor of the tracked object or a motion sensor of the tracked object.

13. The XR device of claim 1, the operations further comprising:

establishing a wireless communication link between the XR device and the tracked object, wherein the object pose prediction is transmitted to the XR device directly from the tracked object via the wireless communication link.

14. The XR device of claim 13, wherein the establishing of the wireless communication link comprises establishing a pose sharing session in which pose data is shared bidirectionally between the XR device and the tracked object via the wireless communication link.

15. The XR device of claim 1, the operations further comprising:

capturing one or more images of a real-world environment; and processing the one or more images to detect the real-world object.

16. The XR device of claim 15, the operations further comprising:

generating a bounding box relative to the real-world object; and using the predicted future pose to localize the real-world object within the bounding box.

17. A method performed by an eXtended Reality (XR) device, the method comprising:

maintaining a tracklet for a tracked object;

receiving an object pose prediction comprising a predicted future pose of the tracked object, the object pose prediction generated by the tracked object based on sensor data obtained using one or more local sensors of the tracked object;

updating the tracklet based on the object pose prediction; and associating a real-world object in a field of view of the XR device with the tracked object based on the updated tracklet.

18. The method of claim 17, wherein the associating of the real-world object with the tracked object comprises using the object pose prediction to disambiguate between multiple detected real-world objects, each of the multiple detected real-world objects being associated with a tracking identifier.

19. The method of claim 17, wherein the XR device is a first XR device, the tracked object is a second XR device, the tracklet comprises a first tracklet, and the sensor data comprises second sensor data, the method further comprising:

generating, based on first sensor data obtained using one or more local sensors of the first XR device, a device pose prediction comprising a predicted future pose of the first XR device; and transmitting the device pose prediction to the second XR device, wherein the second XR device uses the device pose prediction to maintain a second tracklet for the first XR device.

20. At least one non-transitory computer-readable storage medium, the at least one non-transitory computer-readable storage medium including instructions that when executed by at least one processor of an eXtended Reality (XR) device, cause the at least one processor to perform operations comprising:

maintaining a tracklet for a tracked object;

receiving an object pose prediction comprising a predicted future pose of the tracked object, the object pose prediction generated by the tracked object based on sensor data obtained using one or more local sensors of the tracked object;

updating the tracklet based on the object pose prediction; and associating a real-world object in a field of view of the XR device with the tracked object based on the updated tracklet.

* * * * *